(12) United States Patent
Araya et al.

(10) Patent No.: US 9,670,800 B2
(45) Date of Patent: Jun. 6, 2017

(54) CONTROL APPARATUS AND CONTROL METHOD FOR VARIABLE VALVE MECHANISM

(71) Applicant: HITACHI AUTOMOTIVE SYSTEMS, LTD., Hitachinaka-shi, Ibaraki (JP)

(72) Inventors: Norihiro Araya, Isesaki (JP); Hirokazu Shimizu, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/126,814

(22) PCT Filed: Sep. 19, 2014

(86) PCT No.: PCT/JP2014/074840
§ 371 (c)(1),
(2) Date: Sep. 16, 2016

(87) PCT Pub. No.: WO2015/141038
PCT Pub. Date: Sep. 24, 2015

(65) Prior Publication Data
US 2017/0089226 A1 Mar. 30, 2017

(30) Foreign Application Priority Data
Mar. 20, 2014 (JP) .................................. 2014-058905

(51) Int. Cl.
F01L 9/02 (2006.01)
F01L 1/344 (2006.01)
F02D 13/02 (2006.01)

(52) U.S. Cl.
CPC ........ F01L 1/3442 (2013.01); F02D 13/0215 (2013.01); *F01L 2001/3443* (2013.01);
(Continued)

(58) Field of Classification Search
CPC ..... F01L 2001/34426; F01L 2001/3443; F01L 2800/05
(Continued)

(56) References Cited

U.S. PATENT DOCUMENTS

2012/0073531 A1 3/2012 Urushihata

FOREIGN PATENT DOCUMENTS

JP 2008-157066 A 7/2008
JP 2009-174472 A 8/2009
(Continued)

*Primary Examiner* — Jorge Leon, Jr.
(74) *Attorney, Agent, or Firm* — Foley & Lardner LLP

(57) ABSTRACT

A control apparatus and method for a variable valve mechanism operated by an oil pressure by a variable displacement pump that is capable of varying its capacity. A control apparatus and a control method for a variable valve mechanism, by which deterioration of fuel efficiency and deterioration of operability can be suppressed, is provided. When controlling the variable valve mechanism that is operated by the oil pressure by a variable displacement pump, the control gain of the variable valve mechanism is changed, according to the capacity switching condition or the capacity switching operation of the variable valve mechanism. Driving the variable valve mechanism dependent on an actual hydraulic pressure state is enabled by changing the control gain of the variable valve mechanism in response to switching of the variable displacement pump, so that deterioration of fuel efficiency and operability can be inhibited while suppressing overshoot and response lag.

19 Claims, 19 Drawing Sheets

(52) U.S. Cl.
CPC ........... *F01L 2001/34426* (2013.01); *F01L 2001/34453* (2013.01); *F01L 2800/05* (2013.01)

(58) Field of Classification Search
USPC ............................... 123/90.12, 90.15, 90.19
See application file for complete search history.

(56) References Cited

FOREIGN PATENT DOCUMENTS

| | | |
|---|---|---|
| JP | 2009-257162 A | 11/2009 |
| JP | 2012-072674 A | 4/2012 |

| HYDRAULIC PRESSURE CONDITION | SOLENOID | SOLENOID STATE INDICATING VALUE | |
|---|---|---|---|
| | | OFF (HIGH PRESSURE) | ON (LOW PRESSURE) |
| HIGH PRESSURE STICKING | OFF-SIDE STICKING | PHASE CHANGE AMOUNT = EXPECTED VALUE | PHASE CHANGE AMOUNT > EXPECTED VALUE |
| LOW PRESSURE STICKING | ON-SIDE STICKING | PHASE CHANGE AMOUNT < EXPECTED VALUE | PHASE CHANGE AMOUNT = EXPECTED VALUE |

CONTROL APPARATUS AND CONTROL METHOD FOR VARIABLE VALVE MECHANISM

TECHNICAL FIELD

The present invention relates to a control apparatus and a control method for a variable valve mechanism that is operated by an oil pressure by a variable displacement pump that is capable of varying its capacity.

BACKGROUND ART

Conventionally, for an engine that incorporates a hydraulically operated variable valve mechanism (hereinafter, abbreviated as "hydraulic VTC mechanism"), a control gain for estimating an oil pressure based on an engine speed, a temperature of cooling water, etc., and driving the hydraulic VTC mechanism is set. However, when a variable displacement pump, for example, an electronic two-stage hydraulic control pump (also called as "electronic VDVP, or two-stage oil pump when oil is supplied by) is used for supplying oil, hysteresis characteristics are imparted to switching of supply characteristics so that hunting of solenoid is suppressed. For this reason, even at the same engine speed or at the same temperature of cooling water, oil temperatures may be different from an estimated temperature. Thus, a responsiveness and a controllability which are expected for the hydraulic VTC mechanism are not necessarily obtained. Therefore, for example, Patent Document 1 teaches maintaining control stability by switching a target phase under a low hydraulic pressure.

REFERENCE DOCUMENT LIST

Patent Document

Patent Document 1: Japanese Patent Application Laid-open Publication No. 2008-157066

SUMMARY OF THE INVENTION

Problems to be Solved by the Invention

The technical matter disclosed in Patent Document 1 enables to provide control stability. However, when a target phase is changed, the target value phase is no longer an optimum value in an engine operation state. This may cause deterioration of fuel efficiency, operability, etc.

The present invention has been developed in view of the aforementioned circumstances, and an object thereof is to provide a control apparatus and a control method for a variable valve mechanism, by which deterioration of fuel efficiency and deterioration of operability can be suppressed.

Means for Solving the Problems

The control apparatus and the control method for a variable valve mechanism according to the present invention are characterized in that there is provided a control unit configured to switch a control gain of the variable displacement to a control gain for a first oil pressure when the variable displacement pump is under a first oil pressure or the first oil pressure is indicated, and to switch the control gain to a control gain for a second oil pressure that is different from the first oil pressure when the variable displacement pump is under the second oil pressure, or the second oil pressure is indicated; or there is provided a control unit configured to use an oil pressure ratio between the second oil pressure and the first oil pressure as a correction coefficient, and to multiply the control gain of the variable valve mechanism by the correction coefficient based on whether the variable displacement pump is under the first oil pressure or the second oil pressure, or whether the first oil pressure or the second oil pressure is indicated.

Effects of the Invention

According to the present invention, driving of the variable valve mechanism dependent on an actual hydraulic pressure state is enabled by changing the control gain of the variable valve mechanism in response to switching of the variable displacement pump, so that deterioration of fuel efficiency and operability can be inhibited while suppressing overshoot and response lag.

MODE FOR CARRYING OUT THE INVENTION

Figure 1:
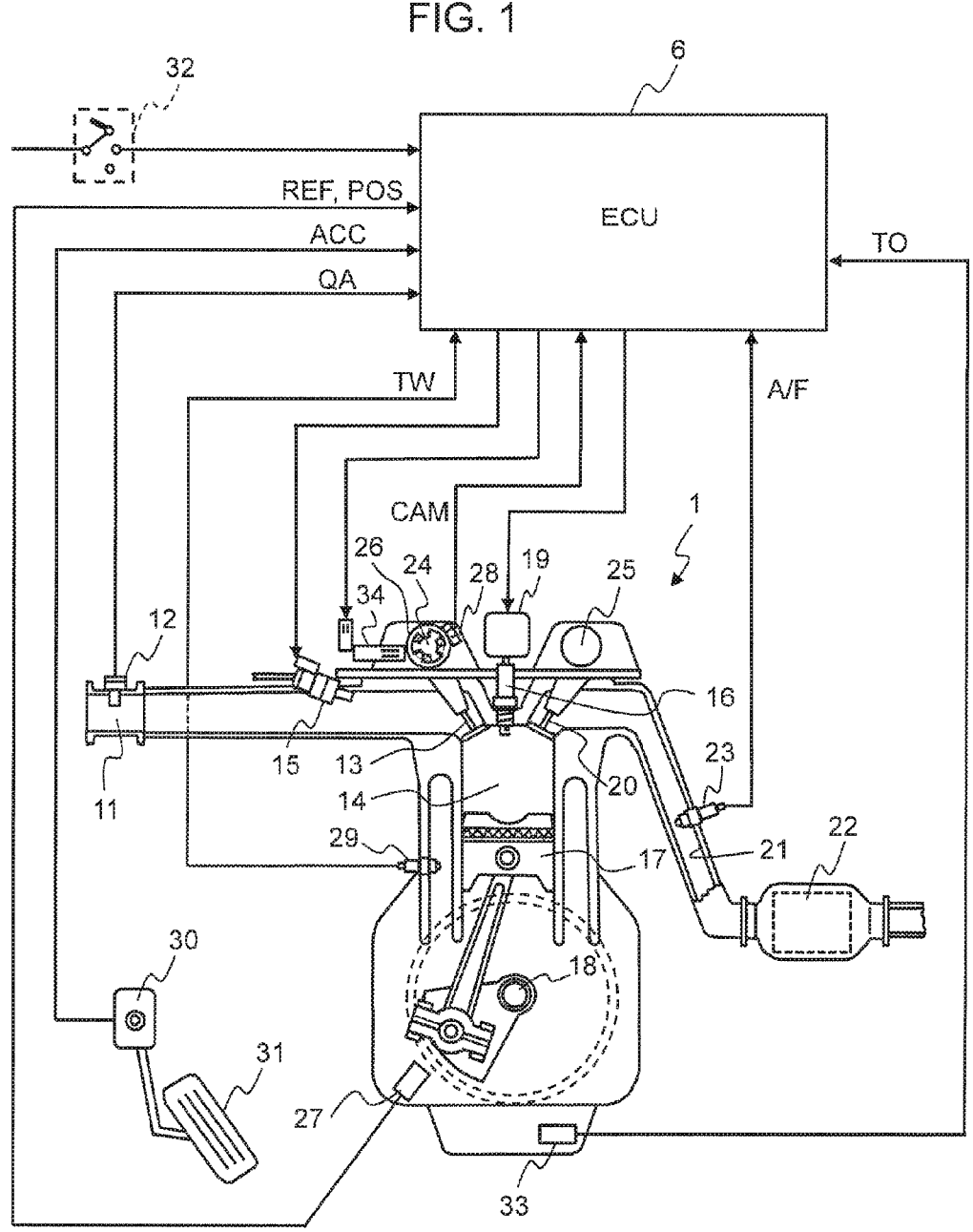
FIG. 1 is a schematic configuration view of an engine to which a control apparatus for a variable valve mechanism according to an embodiment of the present invention is applied.

In the following, an embodiment of the present invention will be described with reference to the accompanying drawings. FIG. 1 is a schematic configuration view of an engine to which a control apparatus for a variable valve mechanism according to the embodiment of the present invention is applied. An intake pipe 11 for introducing air into each cylinder of an engine (internal combustion engine) 1 is provided with an intake air amount sensor 12 for obtaining an intake air flow amount QA of engine 1. For intake air amount sensor 12, for example, a hot-wire flowmeter for obtaining a mass flow rate of intake air may be used.

Intake valves 13 open and close intake ports of a combustion chamber 14 in each cylinder. Intake pipe 11 includes a fuel injection valve 15 for each cylinder on the upstream side of intake valve 13. The fuel injected through fuel injection valve 15 is drawn into combustion chamber 14 together with air via intake valve 13, and is ignited and combusted by spark ignition by a spark plug 16. A pressure generated by the combustion forces a piston 17 downward toward a crank shaft 18 to drive a crank shaft 18 to rotate. A crank angle sensor 27 obtains a rotational angle of crank shaft 18, and outputs a reference position signal REF and a unit angle signal POS, which are involved in crank shaft 18.

An ignition module 19, which supplies ignition energy to spark plug 16, is directly mounted on each spark plug 16. Ignition module 19 includes a spark coil, and a power transistor for controlling application of current to the spark coil. An exhaust valve 20 opens and closes the exhaust port of combustion chamber 14. Opening exhaust valve 20 allows exhaust gas to be discharged to an exhaust pipe 21. A catalytic converter 22, having a three-way catalyst, etc., is disposed in exhaust pipe 21, and purifies exhaust gas. An air-fuel ratio sensor 23, disposed in exhaust pipe 21 on the upstream side of catalytic converter 22, obtains an air-fuel ratio A/F based on oxygen level in exhaust gas.

Intake valve 13 and exhaust valve 20 are operated with rotation of an intake camshaft 24 and rotation of an exhaust camshaft 25, which are driven by crank shaft 18. Intake valve 13 is driven to be opened or closed by a cam provided around intake camshaft 24. The center phase of the operation angle (valve opening angle) of intake valve 13 is made variable by a hydraulic VTC mechanism 26, so that the valve timing of intake valve 13 is advanced or retarded. The hydraulic VTC mechanism 26 is adapted to cause solenoid valve 34 to switch hydraulic passages, whereby the central phase of the operation angle is changed.

A cam angle sensor 28 extracts a reference position signal (intake camshaft rotation angle signal) CAM from intake cam shaft 24. Exhaust valve 20 is driven to be opened or closed by a cam provided around exhaust camshaft 25. Water temperature sensor 29 obtains the temperature of the coolant (water temperature) TW of engine 1. An oil temperature sensor 33 obtains the engine oil temperature TO in an oil pan or in an oil circulation pathway. Furthermore, an accelerator opening sensor 30 obtains a pedaling amount (accelerator opening ACC) of an accelerator 31.

An ECU (Engine Control Unit) 6 includes a microcomputer, and is supplied with signals including, for example, an intake air flow amount signal QA, an accelerator opening signal ACC, a reference position signal REF, a unit angle signal POS, an air-fuel ratio signal A/F, a water temperature signal TW, an oil temperature signal TO, and a rotation angle signal CAM, from various sensors disposed in engine 1. ECU 6 is also supplied with a signal representing the state of an ignition switch 32 that is a main switch for starting or stopping operation of engine 1. Based on such information, ECU 6 performs a computing process according to a pre-stored program, computes a manipulated variable or a control variable for each of the devices such as fuel injection valve 15, solenoid valve 34, ignition module 19, etc., and outputs control signals thereto to control them.

Engine 1 is not limited to an in-line engine that is illustrated in the drawings, it may be of any type such as a V-type, a horizontally-opposed type, or an in-line type. In this description, an engine in which fuel injection valve 15 for injecting a fuel into intake pipe 11 is described by way of example. However, the engine may be a cylinder direct injection engine in which fuel is directly injected into a combustion chamber 14. In addition to intake side VTC mechanism 26, Engine 1 may also include an exhaust side VTC mechanism capable of varying the opening-closing timing of exhaust valve 20 (valve timing).

Figure 2:
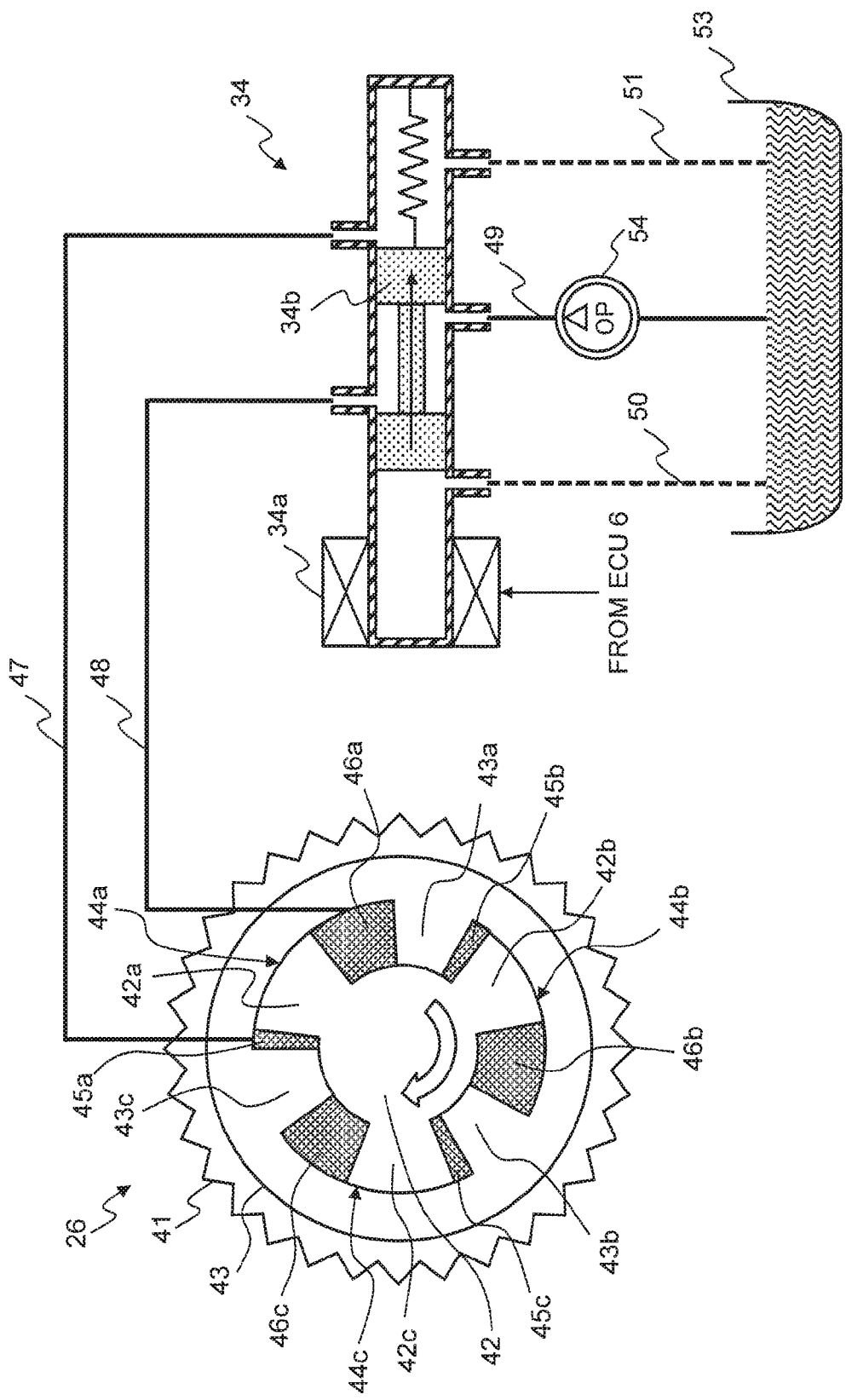
FIG. 2 is a configuration view illustrating an extracted essential part that is involved in change of valve timing by the hydraulic VTC mechanism in FIG. 1.

FIG. 2, which is a view extracted from FIG. 1, illustrates an essential part involved in a change of valve timing of the hydraulic VTC mechanism 26 in FIG. 1. Hydraulic VTC mechanism 26 is disposed at one end of intake camshaft 24 around which the intake cam for opening and closing intake valve 13 is provided. Hydraulic VTC mechanism 26 is constituted by combining a pulley 41 and a rotor 42 in a relatively rotatable manner. Pulley 41 rotates in synchronization with crank shaft 18 of engine 1, and rotor 42 is coupled with intake camshaft 24 in an integrally rotatable manner. Pulley 41 is coupled with crank shaft 18 of engine 1 by a timing belt (not illustrated), and rotates in synchronism with crank shaft 18.

Pulley 41 has a cylindrical housing 43 for accommodating rotor 42. Housing 43 has a cylindrical shape with its both ends open. Housing 43 also includes partition portions 43a, 43b, 43c, which project from the inner surface of the housing and extend in the radial direction of housing 43, so that the inner circumferential surface and partition portions 43a, 43b, 43c, define trapezoidal cross-sections. A plurality of vanes 42a, 42b, 42c, are formed on the outer circumferential face of rotor 42 so as to extend radially outwards therefrom, and housing portions 44a, 44b, 44c for respectively housing these vanes 42a, 42b, 42c are provided radially inside of housing 43. Each of vanes 42a, 42b, 42c has a generally inverted trapezoidal shape in cross-section. Vanes 42a, 42b, 42c respectively partition housing portions 44a, 44b, 44c in the front and rear thereof as viewed in the rotational direction. Accordingly, advance angle-side hydraulic chambers 45a, 45b, 45c and retard angle-side hydraulic chambers 46a, 46b, 46c are formed between both sides of vane 42a, 42b, 42c and both side faces of respective partition portions 43a, 43b, 43c.

A first hydraulic passage 47 supplies and discharges an oil pressure to advance angle-side hydraulic chambers 45a, 45b, 45c, and a second hydraulic passage 48 supplies and discharges an oil pressure to retard angle-side hydraulic chambers 46a, 46b, 46c. Hydraulic passages 47 and 48 are connected to oil supply passage 49 and drain passages 50 and 51 via solenoid valve 34 for switching the passages. An electronic VDVP (variable displacement pump) 54 for pressure-feeding oil within an oil pan 53 is provided in oil supply passage 49. The downstream ends of drain passages 50 and 51 are in communication with an oil pan 53. Solenoid valve 34 is configured such that an internal spool valve body 34b is controlled to relatively switch among hydraulic passages 47, 48, oil supply passage 49, and drain passages 50, 51.

ECU 6 controls a power supply amount to be supplied to solenoid 34a that drives solenoid valve 34, based on a duty control signal (manipulated variable) on which a dither signal is superimposed. For hydraulic VTC mechanism 26, when an off-control signal having a duty ratio of 0% is output to solenoid 34a, the pressure-fed oil from electronic VDVP 54 is supplied to retard angle-side hydraulic chambers 46a, 46b, 46c through hydraulic passage 48, and the oil in advance angle-side hydraulic chambers 45a, 45b, 45c is discharged from drain passage 51 into oil pan 53 through hydraulic passage 47.

In this way, when an off-control signal having a duty ratio of 0% is supplied to solenoid 34a, the internal pressures of retarded angle-side hydraulic chambers 46a, 46b, 46c increase, whereas the internal pressures of advanced angle-side hydraulic chambers 45a, 45b, 45c decrease, whereby rotor 42 is rotated to the most retarded angle side through vanes 42a, 42b, 42c. As a result, the opening period (the center phase of valve operation angle) of intake valve 13 is relatively retarded with respect to a piston position. In other words, when the power supply to solenoid 34a is interrupted, the center phase of the valve operation angle of intake valve 13 is retarded, and ultimately stops at the most retarded angle position.

When an on-control signal having a duty ratio of 100% is output to solenoid 34a, a spool valve body is driven in the arrow direction, so that the oil is supplied to advanced angle-side hydraulic chambers 45a, 45b, 45c through hydraulic passage 47, whereby the internal pressures therein increase. Furthermore, the oil in retarded angle-side hydraulic chambers 46a, 46b, 46c is discharged into oil pan 53 through hydraulic passage 48 and drain passage 50, whereby the internal pressures in retarded angle-side hydraulic chambers 46a, 46b, 46c decrease. Thus, when an on-control signal having a duty ratio of 100% is supplied to solenoid 34a, rotor 42 rotates towards the advanced angle side to a maximum extent via vanes 42a, 42b, 42c, so that the open period (the center phase of the valve operating angle) of intake valve 13 is relatively advanced with respect to a piston position. Accordingly, the center phase of the valve operation angle can be changed to any position within a range between the most retarded angle position and the most advanced angle position by changing the duty cycle of a control signal that is supplied to solenoid 34a. Therefore, the valve opening timing, the valve closing timing, and the valve overlap of an intake valve and an exhaust valve can be changed by controlling the advance angle amount of intake valve 13 according to the operation state of engine 1.

Figure 3:
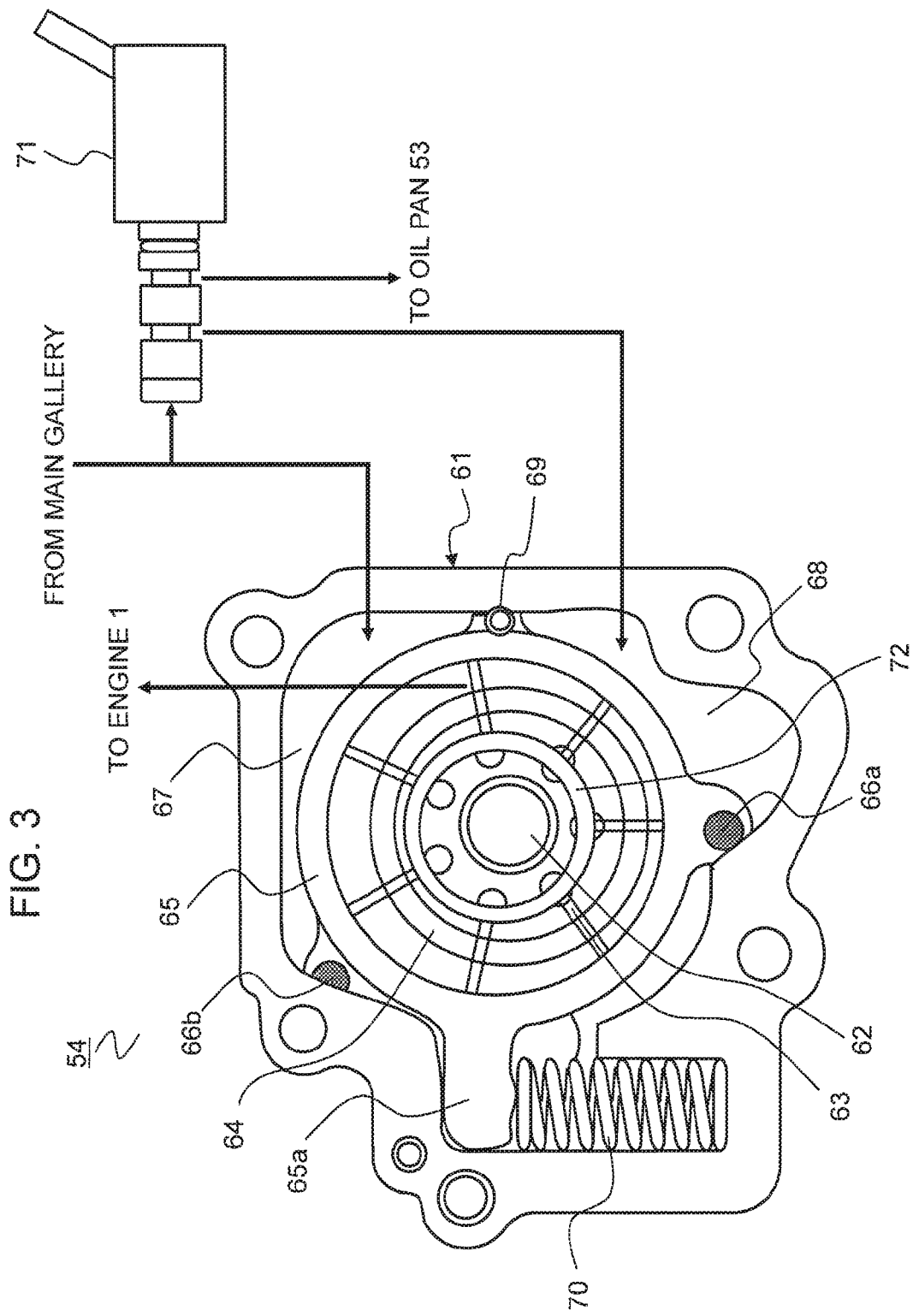
FIG. 3 is a diagram illustrating a configuration example of the electronic VDVP in FIG. 2.

FIG. 3 illustrates a configuration example of electric fuel pump 54 (variable displacement pump) in FIG. 2. An intake port and a discharge port are provided in the both side portions of a pump housing 61. A driving shaft 62, to which torque is transmitted from crank shaft 18 of engine 1, is arranged to approximately pass through the center of pump housing 61. Within pump housing 61, a rotor 64 and a cam ring 65 are arranged. Rotor 64 is connected with driving shaft 62, and supports a plurality of vanes 63 on the outer circumference thereof so that vanes 63 can be freely moved inward and outward in the generally radial direction thereof.

Cam ring 65 is disposed on the radially outer side of rotor 64 so as to be capable of eccentrically oscillating, and the ends of vanes 63 are in sliding contact with the inner circumferential surface of cam ring 65. A pair of vane rings 72 are slidably disposed on the both side surfaces of rotor 64.

Cam ring 65 is arranged to be oscillated in a direction to decrease the eccentric quantity about a pivot pin 69 according to the pump discharge pressure applied into working chambers 67 and 68 which are defined via sealing members 66a, 66b around the outer circumference of cam ring 65. Furthermore, cam ring 65 is also arranged to be oscillated in a direction to increase the eccentric quantity by a spring force of a coil spring 70 applied to a lever portion 65a, which is integrally formed on the outer circumference of cam ring 65. In an initial state, cam ring 65 is urged by the spring force of coil spring 70, in the direction in which the eccentric quantity becomes maximum, thereby increasing the discharge pressure. When the hydraulic pressure within working chamber 67 reaches or exceeds a predetermined quantity, cam ring 65 is oscillated against the spring force of coil spring 70, in the direction to decrease the eccentric quantity, thereby decreasing the discharge pressure.

Working chamber 67 of this electronic VDVP 54 is supplied with oil from a main gallery, working chamber 68 is supplied with oil via on/off solenoid valve 71, and oil discharged therefrom is supplied to engine 1. When solenoid valve 71 is on, the working chamber 67 communicates with the drain (oil pan 53), and is brought into a low pressure state, whereas when solenoid valve 71 is off, a hydraulic pressure is applied to working chamber 67, working chamber 67 is brought into a high pressure state. Accordingly, in a situation in which a required oil pressure is low (at low speed rotation), a pump discharge amount can be decreased, so that an auxiliary load can be reduced. In a situation in which a required oil pressure is high (at high speed rotation), a pump discharge amount can be increased, so that requirements such as lubricating requirement and cooling requirement can be satisfied.

Next, operations in the configuration described above will be explained. According to the present invention, in engine 1 including hydraulic VTC mechanism 26 and electronic VDVP 54, the control gain of hydraulic VTC mechanism 26 is changed according to a switching condition or a switching operation of electronic VDVP 54. In other words, whether there is establishment of a capacity switching condition or whether there is a capacity switching operation in electronic VDVP 54 is detected. If the establishment of capacity switching condition or the capacity switching operation is detected, the control gain of hydraulic VTC mechanism 26 is changed. More particularly, whether the state of solenoid valve 71 of electronic VDVP 54 is at high-pressure side or at low-pressure side is decided, and the control gain of hydraulic VTC mechanism 26 is switched based on whether it is the high-pressure side state or the low-pressure side state. Alternatively, the control gain is corrected (limited). In addition, when the control gain is switched, correction is applied to the control gain so that the change of the control gain follows the rising (or falling) characteristic of the actual oil pressure. The operations mentioned above are basically realized by controlling solenoid valve 34 of hydraulic VTC mechanism 26 and solenoid valve 71 of electronic VDVP 54 with reference to outputs from various sensors, and pre-stored maps, correction coefficients, etc., in accordance with a program in ECU 6.

Specific control methods will be described below.
First Control Method

Figure 4:
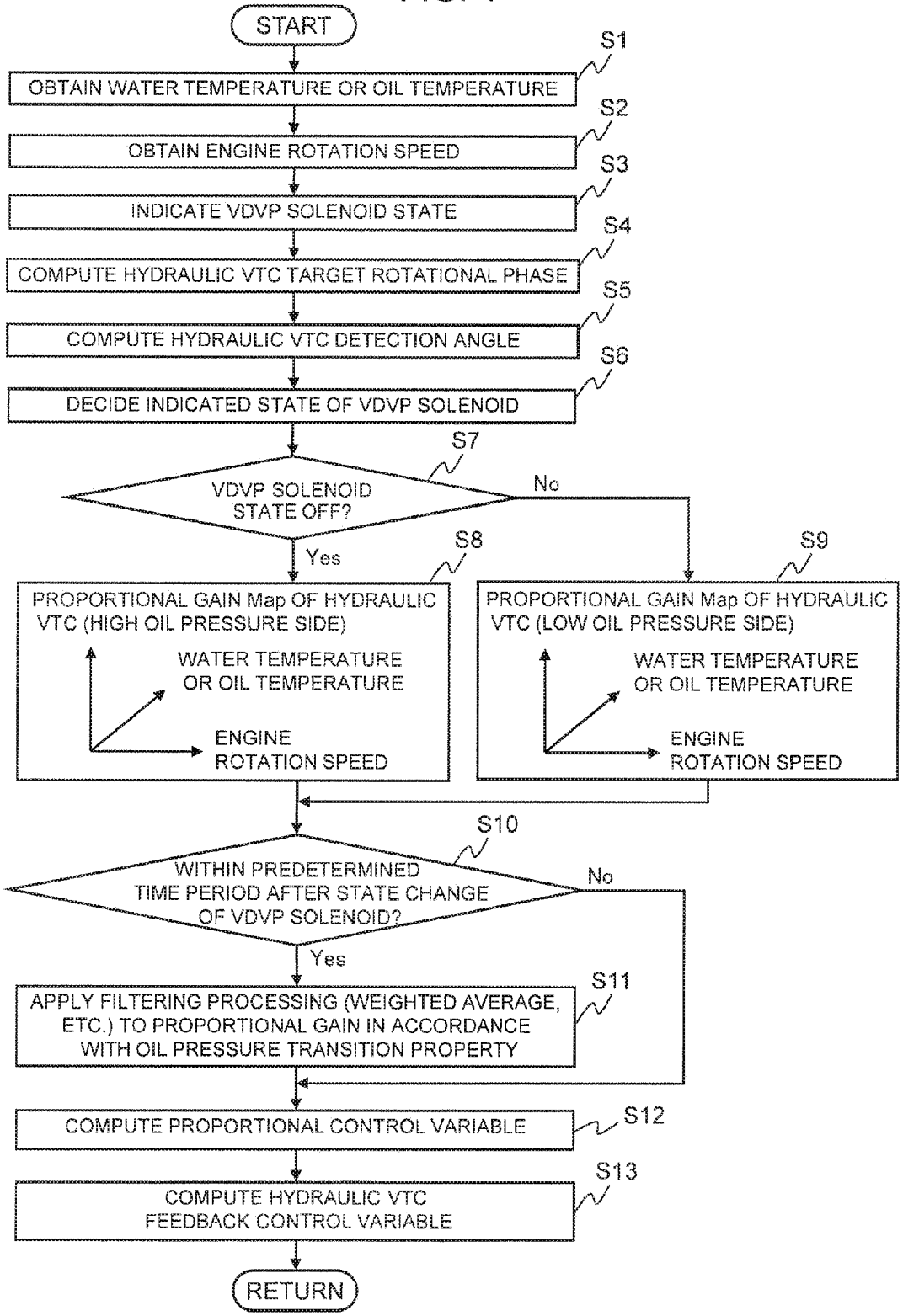
FIG. 4 is a flowchart illustrating a first control method of the control unit for the variable valve mechanism according to the embodiment of the present invention.

A first control method illustrated in FIG. 4 is provided for switching a map of a feedback controlled variable. First, a temperature of the cooling water (water temperature) TW of engine 1 is obtained by water temperature sensor 29, or an oil temperature TO of the engine oil is obtained by oil temperature sensor 33 (step S1). Furthermore, for example, an engine rotation speed is obtained by obtaining the rotational angle of crank shaft 18 (a reference position signal REF and a unit angle signal POS) by crank angle sensor 27 (step S2). In step S3, ECU 6 indicates the state (on or off) of solenoid valve 71 of electronic VDVP 54. In next step S4, ECU 6 computes a target rotational phase of hydraulic VTC mechanism 26. In step S5, ECU 6 computes a detection angle for hydraulic VTC mechanism 26 based on a reference position signal CAM extracted from intake camshaft 24 by cam angle sensor 28. Such computations for obtaining the target rotational phase and the detection angle can be performed using well known algorithms.

Subsequently, after determining the indicated state of solenoid valve 71 (step S6), whether or not the state of solenoid valve 71 is off is decided (step S7). Determination of the indicated state of solenoid valve 71 is basically performed by deciding the state indicated by ECU 6. However, for the failure (on-state sticking, off-state sticking) of solenoid valve 71, reference is made to diagnose results described later. If solenoid valve 71 is off, the proportional gain map of hydraulic VTC mechanism 26 is switched to the high pressure side (step S8), whereas it is on, the proportional gain map of hydraulic VTC mechanism 26 is switched to the low pressure side (step S9). In steps S8 and S9, a water temperature TW or an oil temperature TO is used in the proportional gain map. However, using an oil temperature is preferable. A water temperature TW may be used as a substitute therefor when oil temperature sensor 33 is not provided.

In step S10, it is decided whether an elapsed time is within a predetermined time after change of the state of solenoid valve 71. If it is within the predetermined time, the proportional gain is subjected to filtering (weighted average, etc.) in accordance with the oil pressure transition property (step S11), and a proportional control operation is performed (step S12). If it is not within the predetermined time, the control proceeds to step S12, in which proportional control operation is performed. The filtering processing in step S11 is for causing time delay also in proportional gain, because oil pressure changes entailing a time delay even if solenoid valve 71 is switched. Furthermore, in step S12, a proportional controlled variable is computed using the proportional gain and the phase of "target angle-actual angle". A smooth transition provided by the filtering processing enables gradual change of the proportional gain. In next step S13, a feedback controlled variable of hydraulic VTC mechanism 26 is computed by ECU 6, using the proportional controlled variable that was computed in previous step S12, an integral manipulated variable, a derivative manipulated variable, etc. Then, based on the computed feedback control variable, ECU 6 supplies a duty control signal to solenoid 34*a* of solenoid valve 34, so as to cause hydraulic VTC mechanism 26 to advance or retard the valve timing of intake valve 13.

According to the control method as described above, the proportional gain maps of hydraulic VTC mechanism 26 are respectively prepared for the high-pressure side and the low-pressure side, and a map to be referenced is switched based on whether solenoid valve 71 is on or off, whereby hydraulic VTC mechanism 26 is allowed to be driven according to an actual oil pressure state, overshoot and response delay can be suppressed, and deterioration of fuel efficiency, operability, etc., can be suppressed. Furthermore, smooth transition provided by the filtering processing enables gradual change of the proportional gain. In the control method above, the proportional gain maps of hydraulic VTC mechanism 26 are prepared for the high oil pressure side and the low oil pressure side. However, this may be similarly applied to control gains such as a derivative gain and an integral gain in the PID control, as well as the proportional gain.

Figure 5:
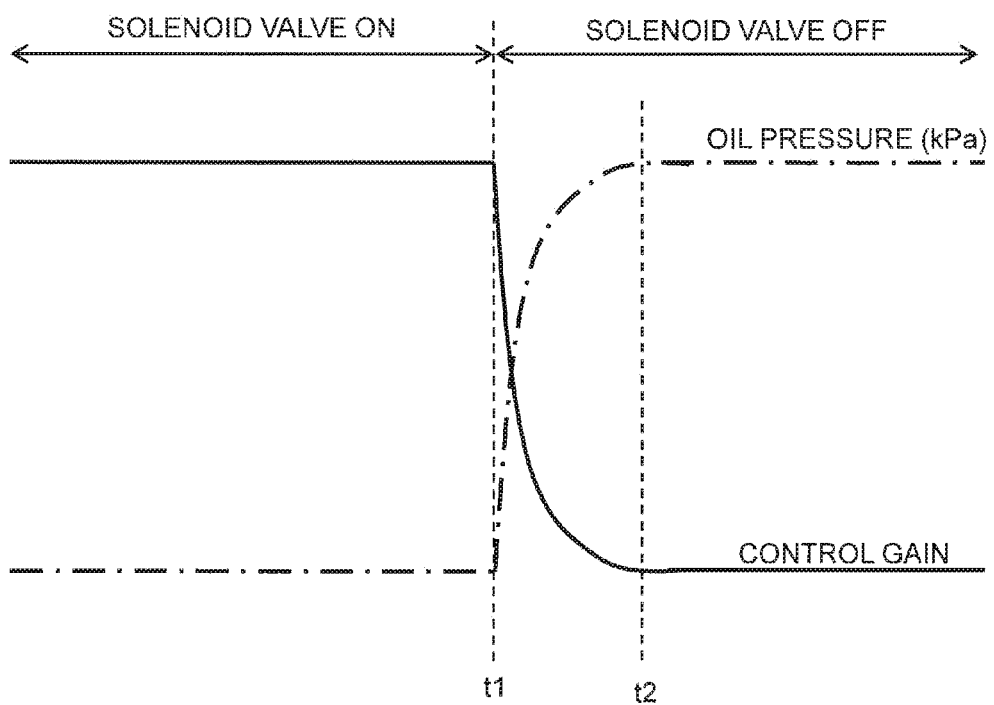
FIG. 5 is a timing chart illustrating the relationship between an oil pressure and a control gain in the first control method illustrated in FIG. 1.

FIG. 5 illustrates the relationship among on/off of the solenoid valve 71, the control gain, and the oil pressure, in steps S10 to S13 described above. Assuming that solenoid valve 71 is switched from on to off at time t1 and the oil pressure suddenly rises, and the oil pressure reaches a predetermined value at time t2, the control gain gradually decreases from time t1, and is switched at t2. Thus, correction corresponding to the delay of rise of oil pressure is performed so as to cause time lag in changing of the control gain, whereby the responsiveness of hydraulic VTC mechanism 26 can be maintained.

Second Control Method

Figure 6:
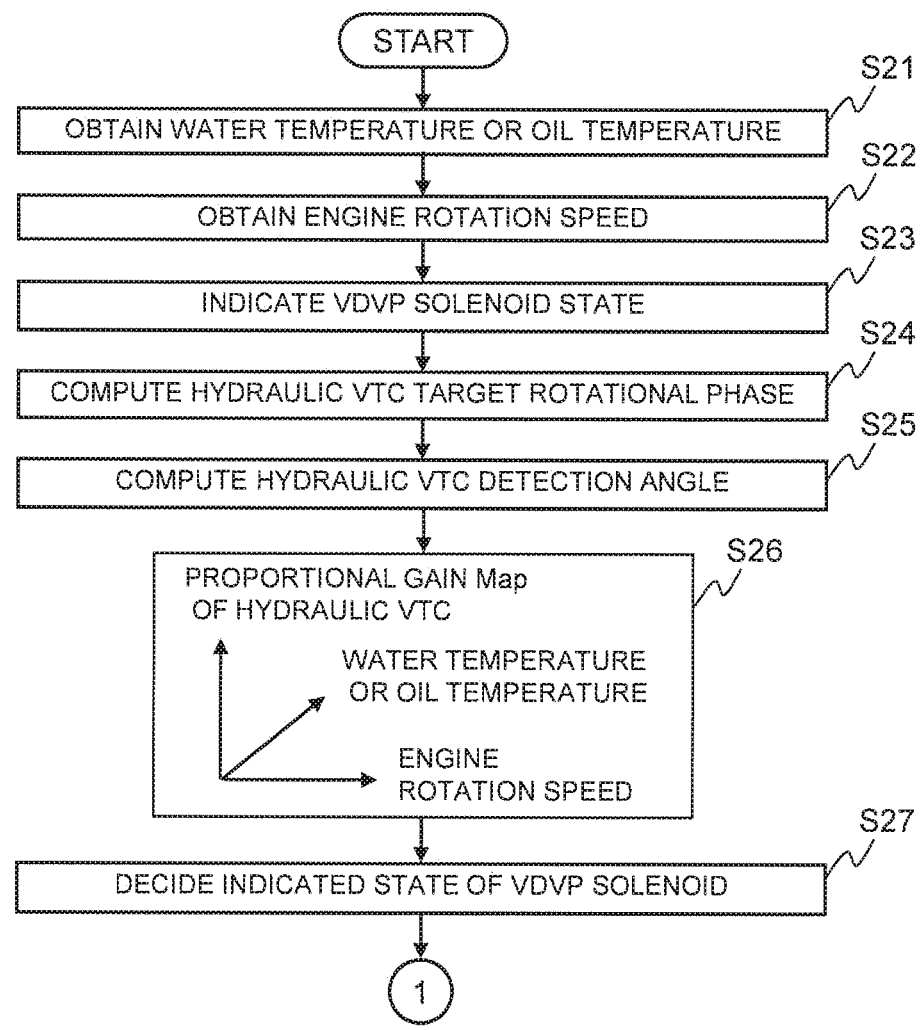
FIG. 6 is a flowchart illustrating a second control method of the control unit for the variable valve mechanism according to the embodiment of the present invention.
Figure 7:
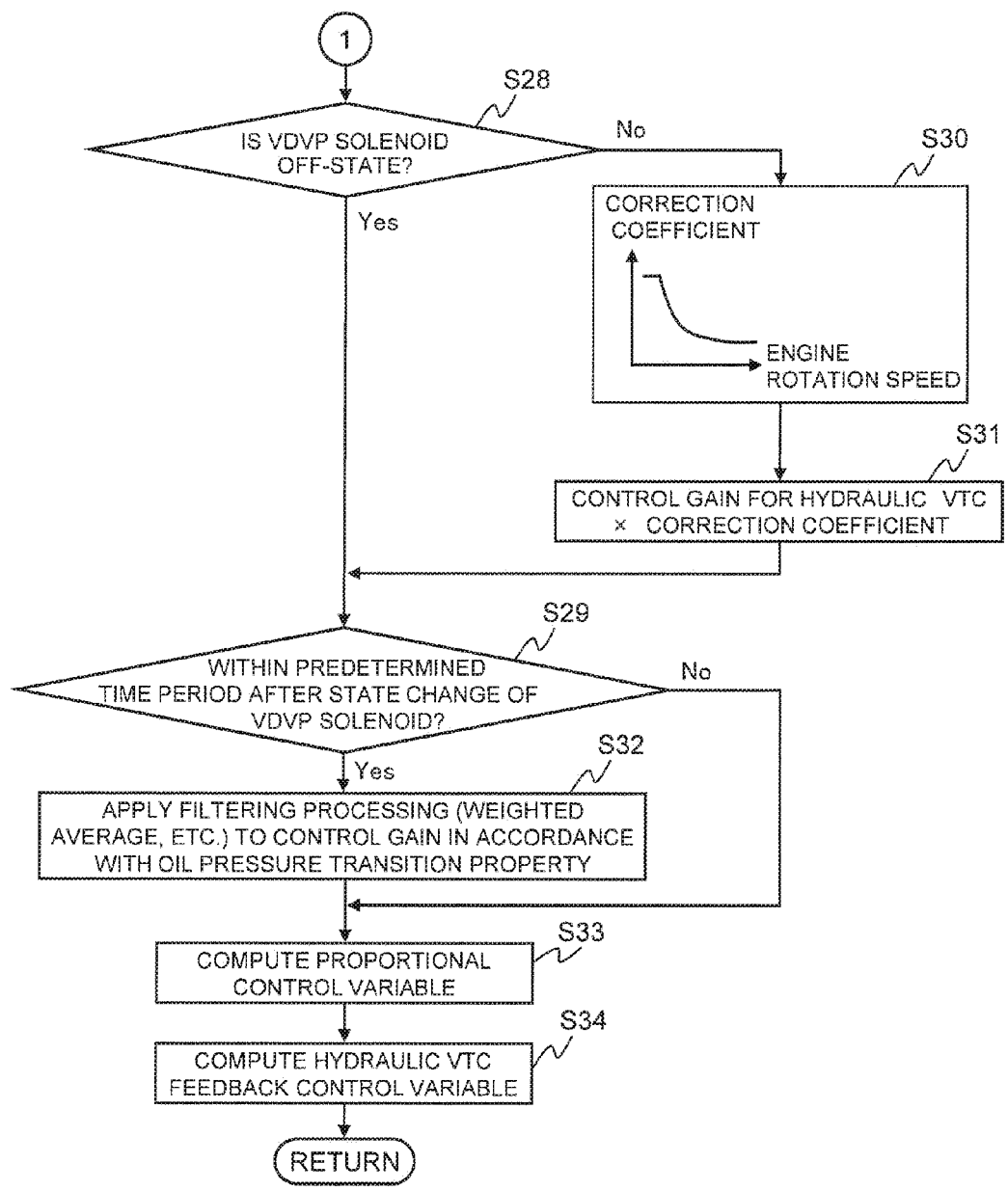
FIG. 7 is a flowchart illustrating the control method continued from FIG. 6.

A second control method illustrated in FIG. 6 and FIG. 7 is for correcting a gain of a feedback controlled variable (control gain). Similar to the first control method, a water temperature or an oil temperature is obtained (step S21), and an engine rotation speed is obtained (step S22). In step S23, the state of solenoid valve 71 is indicated. In subsequent step S24, a target rotational phase of hydraulic VTC mechanism 26 is computed. In step S25, the detection angle of hydraulic VTC mechanism 26 is computed.

Subsequently, a control gain map of hydraulic VTC mechanism 26 is read (step S26). Although a water temperature TW or an oil temperature TO is used in the control gain map, it is preferable to use an oil temperature TO. When oil temperature sensor 33 is not provided, water temperature TW may be substituted therefor. Subsequently, after determining the state indication of solenoid valve 71 (step S27), whether or not the state of solenoid valve 71 is off is decided (step S28). Determination of the state indication of solenoid valve 71 is basically performed by determining the state indicated by ECU 6. However, for the failure (on-state sticking, off-state sticking) of solenoid valve 71, reference is not made to the stated indicated by ECU 6, but is made to diagnose results described later. If solenoid valve 71 is off, it is decided whether the elapsed time after change of the state of solenoid valve 71 is within a predetermined time (step S29). If solenoid valve is on, a map, in which the oil pressure ratio between the low oil pressure side and the high oil pressure side for each engine rotation speed is stored, is referred (step S30), then, the control gain of hydraulic VTC mechanism 26 is multiplied by a correction coefficient (step S31), and it is determined whether within the predetermined time.

In step S32, if the result of decision in step S29 is within the predetermined time, the control gain is subjected to filtering (weighted average, etc.) in accordance with the oil pressure transition property (step S32), and a proportional control operation is performed (step S33). If it is not within the predetermined time, control proceeds to step S33, in which proportional control operation is performed. The filtering processing in step S32 is for causing a time delay also in the control gain, because oil pressure changes entailing a time delay even if solenoid valve 71 is switched. Furthermore, in step S33, a proportional controlled variable is computed using the proportional gain and the phase of "target angle-actual angle". Smooth transition provided by the filtering processing enables gradual change of the control gain. In next step S34, a feedback control variable of hydraulic VTC mechanism 26 is computed, using the proportional controlled variable that was computed in previous step S33, an integral manipulated variable, a derivative manipulated variable, etc. Then, based on the computed feedback control variable, ECU 6 supplies a duty control signal to solenoid 34a of solenoid valve 34, so as to cause hydraulic VTC mechanism 26 to advance or retard the valve timing of intake valve 13.

According to the control method as described above, the map, in which the oil pressure ratios at the low oil pressure side and the high oil pressure side for each engine rotation speed are stored as correction coefficients, is referenced, the control gain of hydraulic VTC mechanism 26 is multiplied by the correction coefficient, whereby hydraulic VTC mechanism 26 is allowed to be driven according to an actual oil pressure state, overshoot and response delay can be suppressed, and deterioration of fuel efficiency, operability, etc., can be suppressed. Furthermore, smooth transition provided by the filtering processing enables gradual change of the control gain.

Third Control Method

Figure 8:
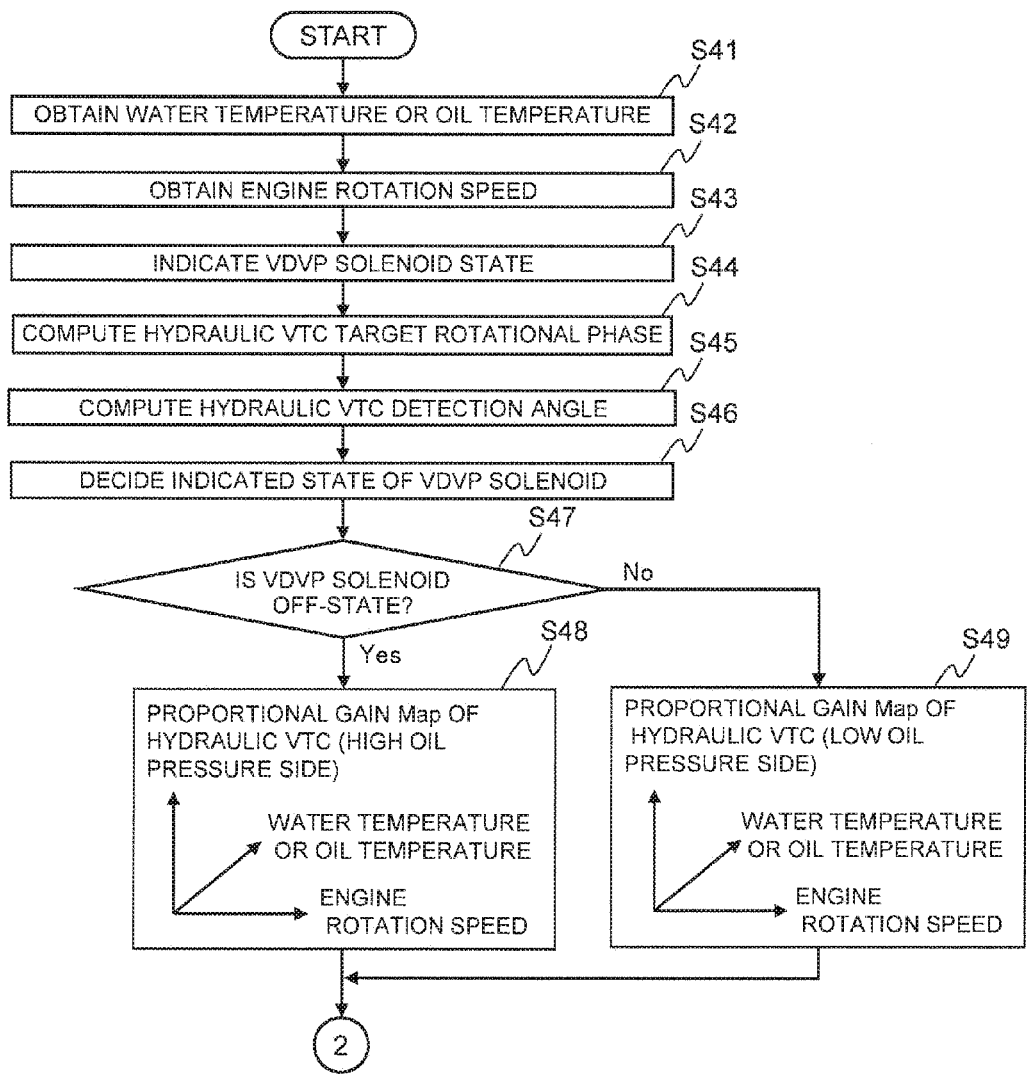
FIG. 8 is a flowchart illustrating a third control method of the control unit for the variable valve mechanism according to the embodiment of the present invention.
Figure 9:
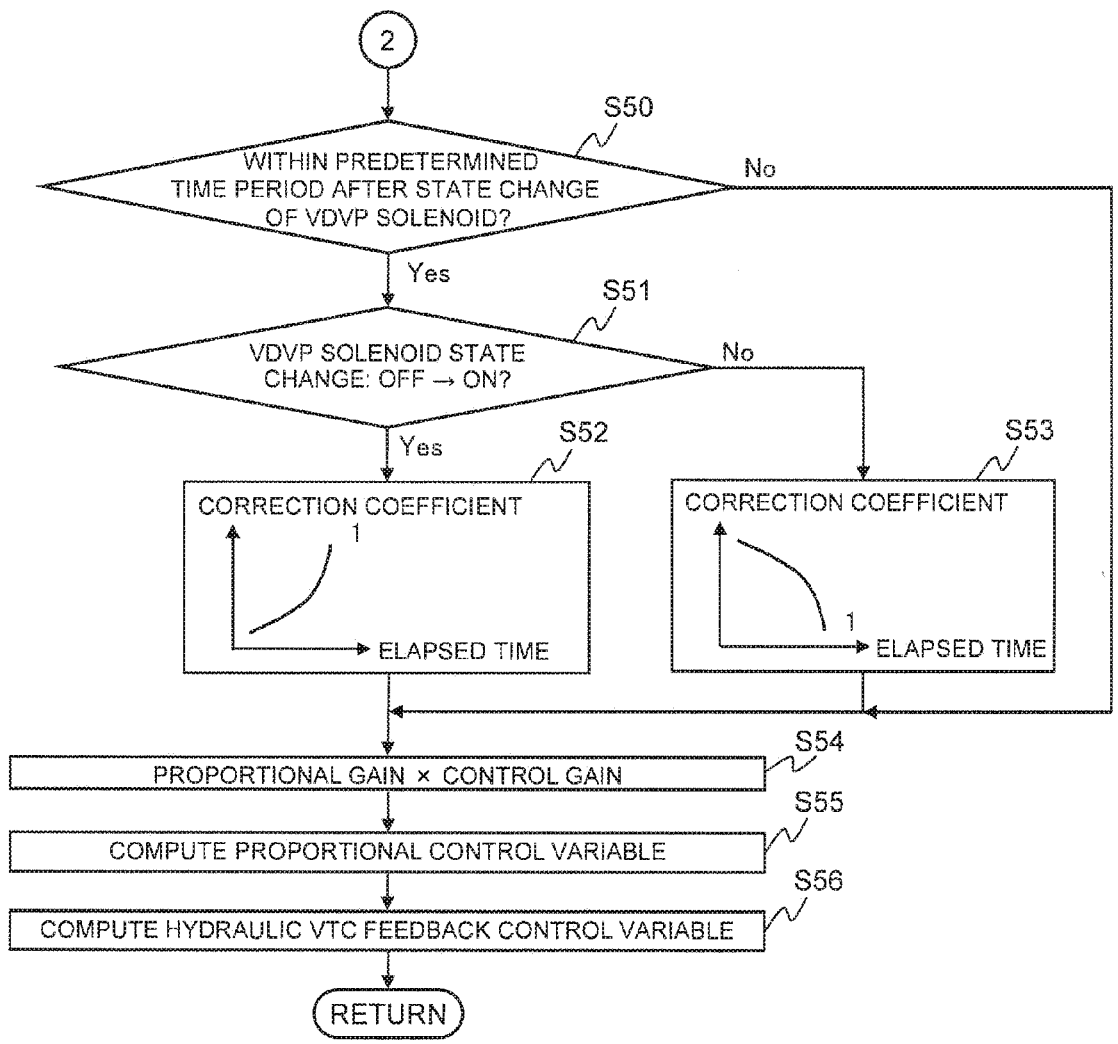
FIG. 9 is a flowchart illustrating the control method continued from FIG. 8.

A third control method illustrated in FIG. 8 and FIG. 9 is different from the first control method described above in transitional correction method for a feedback controlled variable. In other words, although switching by use of a map for two control gains for the high-pressure side and the low-pressure side is similar, the manner of smoothing manner based on filtering processing is changed from the first control method. In the first and second control methods, what is experimentally determined is set as a gain of the filter, in the third control method, the correction coefficient is changed based on whether solenoid valve 71 is switched from off to on, or from on to off. Specifically, from the high-pressure side to the low-pressure side, the correction coefficient is increased, finally to 1 (an uncorrected state). From the low-pressure side to the high-pressure side, the correction coefficient is set to be gradually decreased, finally to 1 (an uncorrected state).

That is, a water temperature or an oil temperature is obtained (step S41), and an engine rotation speed is obtained (step S42). In step S43, the state of solenoid valve 71 is indicated. In subsequent step S44, a target rotational phase of hydraulic VTC mechanism 26 is computed. In step S45, the detection angle of hydraulic VTC mechanism 26 is computed. Subsequently, after determining the indicated state of solenoid valve 71 (step S46), whether or not the state of solenoid valve 71 is off is decided (step S47). Determination of the state indication of solenoid valve 71 is basically performed by determining the state indicated by ECU 6. However, for the failure (on-state sticking, off-state sticking) of solenoid valve 71, reference is not made to the stated indicated by ECU 6, but is made to diagnose results described later. If solenoid valve 71 is off, the proportional gain map of hydraulic VTC mechanism 26 is switched to the high pressure side (step S48), whereas it is on, the proportional gain map of hydraulic VTC mechanism 26 is switched to the low pressure side (step S49). In steps S48 and S49, a water temperature TW or an oil temperature TO is used in the proportional gain map. However, using an oil temperature is preferable. A water temperature TW may be used as a substitute therefor when oil temperature sensor 33 is not provided.

In step S50, it is decided whether within a predetermined time after change of the state of solenoid valve 71. If it is within the predetermined time, it is decided whether or not the state of solenoid valve 71 is changed from off to on. When changed from off to on, the map for increasing the correction coefficient finally to 1 (uncorrected state) is referenced (step S52), and the proportional gain is multiplied by a correction coefficient in the map (step S54). In contrast, when changed from on to off, the map for decreasing the correction coefficient finally to 1 (uncorrected state) is referenced (step S53), and the proportional gain is multiplied by a correction coefficient in the map (step S53). On the other hand, if it is not within the predetermined time in step S50, control precedes to step S54, in which the proportional gain is multiplied by the correction coefficient.

In next step S55, a proportional control operation is performed. By the proportional control operation, a proportional controlled variable is computed using the proportional gain and the phase of "target angle-actual angle". In next step S56, a feedback control variable of hydraulic VTC mechanism 26 is computed, using the proportional controlled variable that was computed in previous step S55, an integral manipulated variable, a derivative manipulated variable, etc. Then, based on the computed feedback control variable, ECU 6 supplies a duty control signal to solenoid 34a of solenoid valve 34, so as to cause hydraulic VTC mechanism 26 to advance or retard the valve timing of intake valve 13. Even according to the control method as described above, similar to the first and second control methods described above, hydraulic VTC mechanism 26 is allowed to be driven according to an actual oil pressure state, overshoot and response delay can be suppressed, and deterioration of fuel efficiency, operability, etc., can be suppressed.

Fourth Control Method

Figure 10:
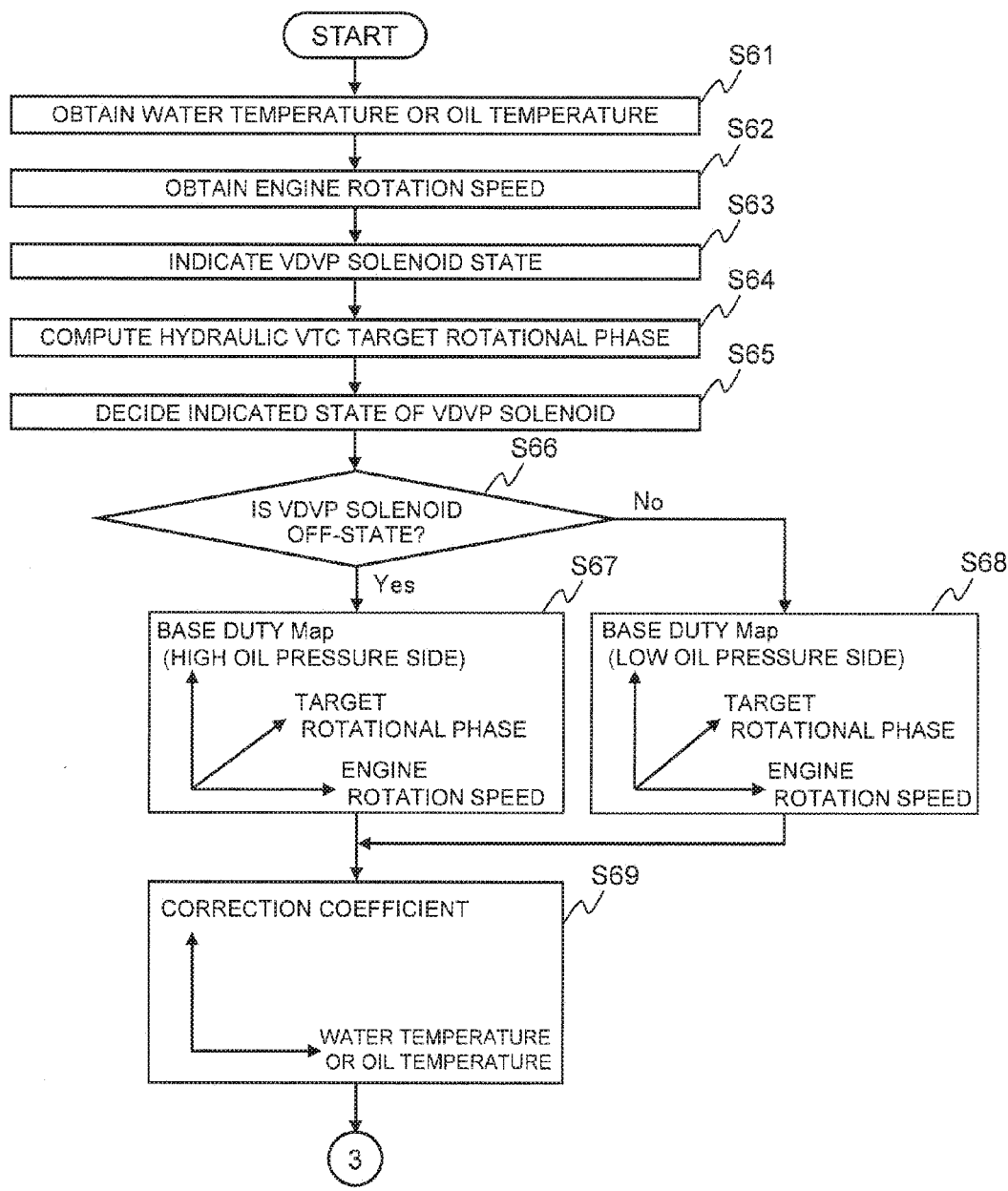
FIG. 10 is a flowchart illustrating a fourth control method of the control unit for the variable valve mechanism according to the embodiment of the present invention.
Figure 11:
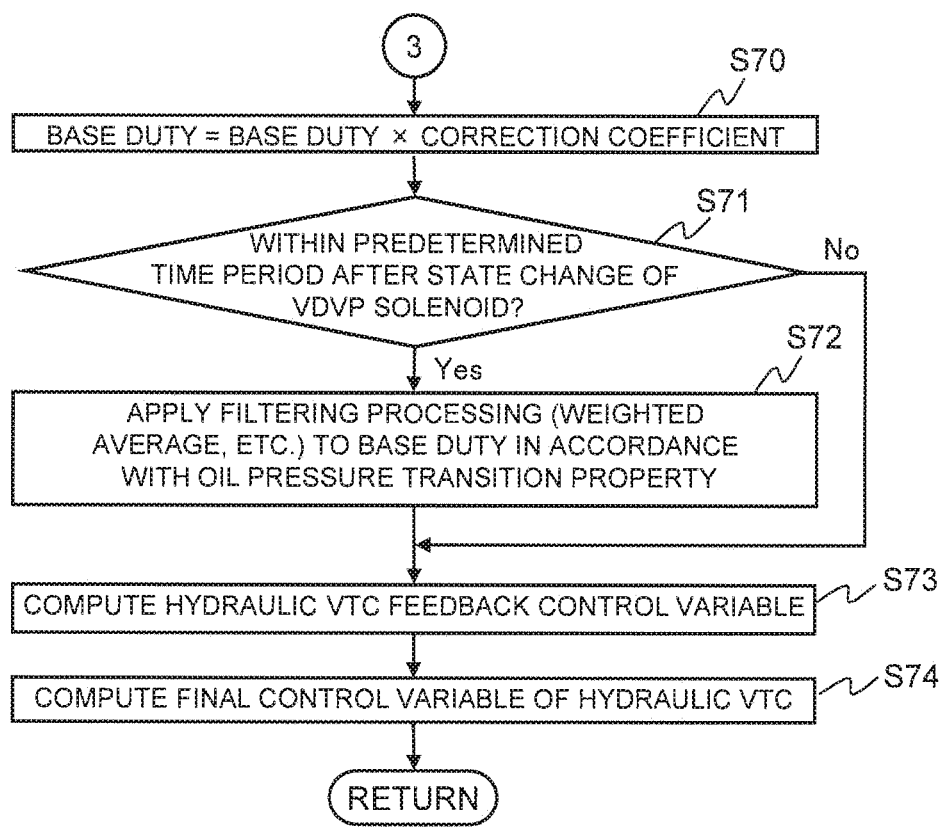
FIG. 11 is a flowchart illustrating the control method continued from FIG. 10.

In a fourth control method illustrated in FIGS. 10 and 11, there are two base duty (maintenance base duty) maps, one for high oil pressure side and the other for low pressure side, and the map is switched based on duty ratio, not based on on/off of solenoid valve 72. First, a water temperature or an oil temperature is obtained (step S61), and an engine rotation speed is obtained (step S62). In step S63, the state of solenoid valve 71 is indicated. In subsequent step S64, a target rotational phase of hydraulic VTC mechanism 26 is computed.

Subsequently, after determining the indicated state of solenoid valve 71 (step S65), whether or not the state of solenoid valve 71 is off is decided (step S66). Determination of the state indication of solenoid valve 71 is basically performed by determining the state indicated by ECU 6. However, for the failure (on-state sticking, off-state sticking) of solenoid valve 71, reference is not made to the stated indicated by ECU 6, but is made to diagnose results described later. If solenoid valve 71 is off, the base duty map of hydraulic VTC mechanism 26 is switched to the high pressure side (step S67), whereas if it is on, the base duty map of hydraulic VTC mechanism 26 is switched to the low pressure side (step S68).

In step S69, a map, in which the relationship between the water or oil temperature and the correction coefficient is stored, is referenced. In step S70, the result obtained by multiplying the base duty with the correction coefficient is newly defined as a base duty. In step S71, it is decided whether an elapsed time after the change of the state of solenoid valve 71 is within a predetermined time. If it is within the predetermined time, the base duty is subjected to filtering (weighted average, etc.) in accordance with the oil pressure transition property (step S71), and the feedback control variable of hydraulic VTC mechanism 26 is operated (step S73). If it is not within the predetermined time, control proceeds to step S73, in which feedback control variable is operated. In next step S74, the feedback control variable computed in previous step S73 and the base duty corrected in step S70 are summed, and a final control variable of hydraulic VTC mechanism 26 is computed. Then, based on the computed final control variable, ECU 6 supplies a duty control signal to solenoid 34a of solenoid valve 34, so that the valve timing of intake valve 13 is advanced or retarded.

According to the control method as described above, the base duty maps of hydraulic VTC mechanism 26 are respectively prepared for the high-pressure side and the low-pressure side, and a map to be referenced is switched based on whether solenoid valve 71 is on or off, and the base duty is corrected, whereby hydraulic VTC mechanism 26 is allowed to be driven according to an actual oil pressure state while maintaining the rotational phase of hydraulic VTC mechanism 27, overshoot and response delay can be suppressed, and deterioration of fuel efficiency, operability, etc., can be suppressed.

Fifth Control Method

Figure 12:
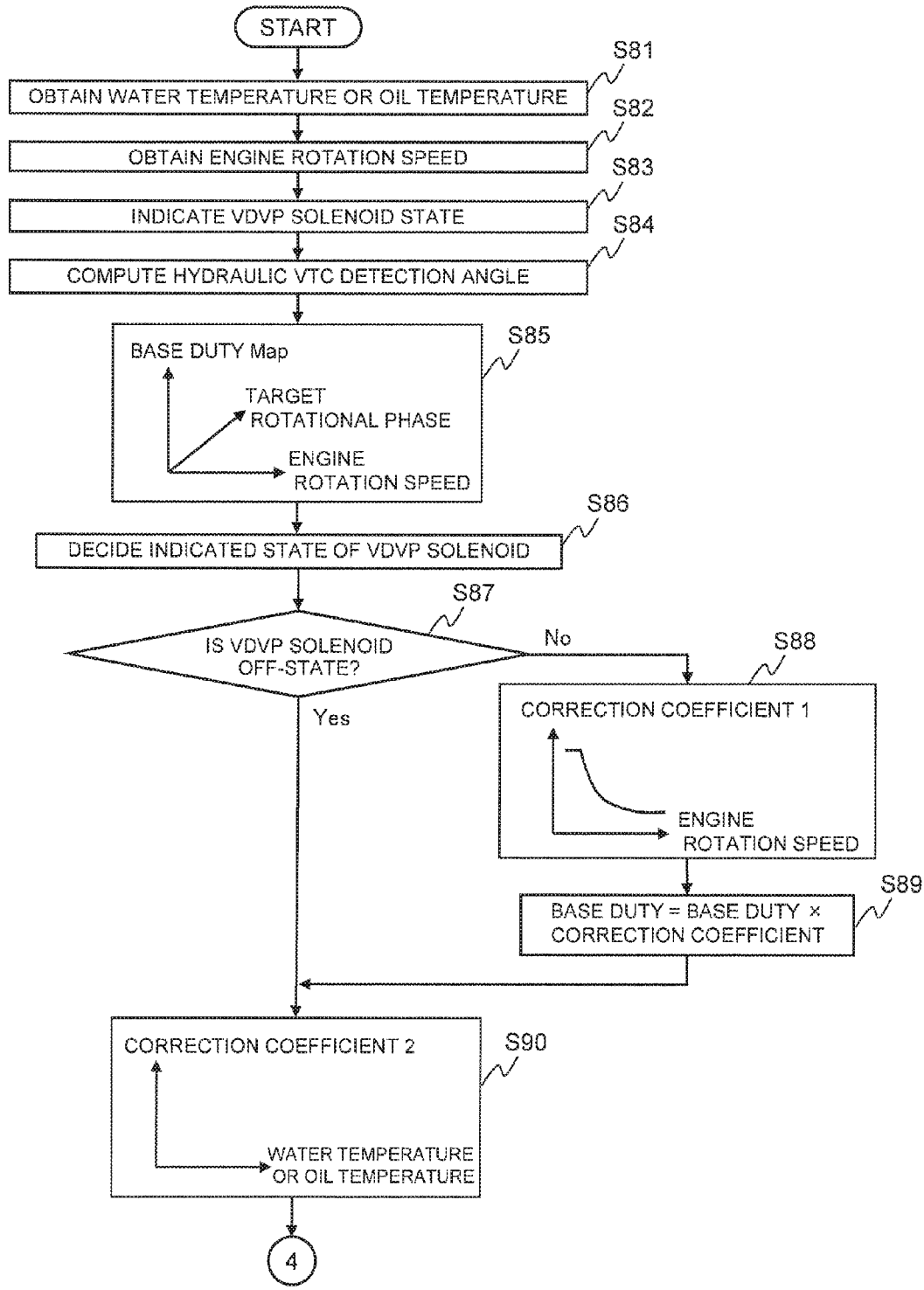
FIG. 12 is a flowchart illustrating a fifth control method of the control unit for the variable valve mechanism according to the embodiment of the present invention.
Figure 13:
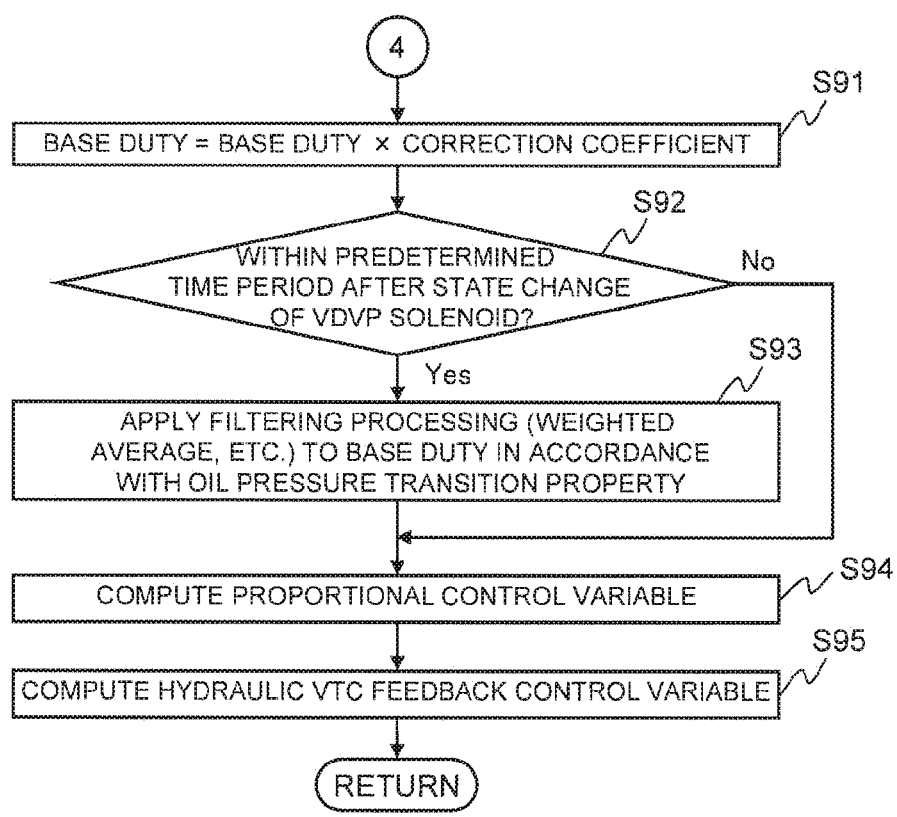
FIG. 13 is a flowchart illustrating the control method continued from FIG. 12.

The fifth control method illustrated in FIG. 12 and FIG. 13 is for correcting the base duty. First, a water temperature or an oil temperature is obtained (step S81), and an engine rotation speed is obtained (step S82). In step S83, the state of solenoid valve 71 is indicated. In subsequent step S84, a target rotational phase of hydraulic VTC mechanism 26 is computed.

Subsequently, after the base duty map is referenced (step S85) and the state indication of solenoid valve 71 is determined (step S86), whether or not the state of solenoid valve 71 is off is decided (step S87). Determination of the state indication of solenoid valve 71 is basically performed by determining the state indicated by ECU 6. However, for the failure (on-state sticking, off-state sticking) of solenoid valve 71, reference is not made to the stated indicated by ECU 6, but is made to diagnose results described later. If solenoid valve 71 is off, the map that represents the relationship between the water or oil temperature and the correction coefficient 2 is referenced (in step S90), and the result obtained by multiplying the base duty with the correction coefficient is defined as a new base duty. On the other hand, if solenoid valve is not off, the map that represents the relationship between the engine rotation speed and the correction coefficient 1 is referenced (in step S88), and the result obtained by multiplying the base duty with the correction coefficient is newly defined as a base duty (step S90), and control proceeds to step S90.

In step S92, it is decided whether an elapsed time after change of the state of solenoid valve 71 is within a predetermined time. If it is within the predetermined time, the control gain is subjected to filtering (weighted average, etc.) in accordance with the oil pressure transition property (step S93), and a proportional control variable is computed (step S94). If it is not within the predetermined time, control proceeds to step S94, in which proportional control variable is operated. In next step S95, the proportional control variable computed in previous step S94 and the base duty corrected in step S91 are summed, and a final control variable of hydraulic VTC mechanism 26 is computed. Then, based on the computed feedback control variable, ECU 6 supplies a duty control signal to solenoid 34a of solenoid valve 34, so as to cause hydraulic VTC mechanism 26 to advance or retard the valve timing of intake valve 13.

According to the control method as described above, correction of the base duty of hydraulic VTC mechanism 26 is switched based on whether solenoid valve 71 is on or off, and the base duty is corrected, whereby hydraulic VTC mechanism 26 is allowed to be driven according to an actual oil pressure state while maintaining the rotational phase of hydraulic VTC mechanism 27, overshoot and response delay can be suppressed, and deterioration of fuel efficiency, operability, etc., can be suppressed.

Sixth Control Method

Figure 14:
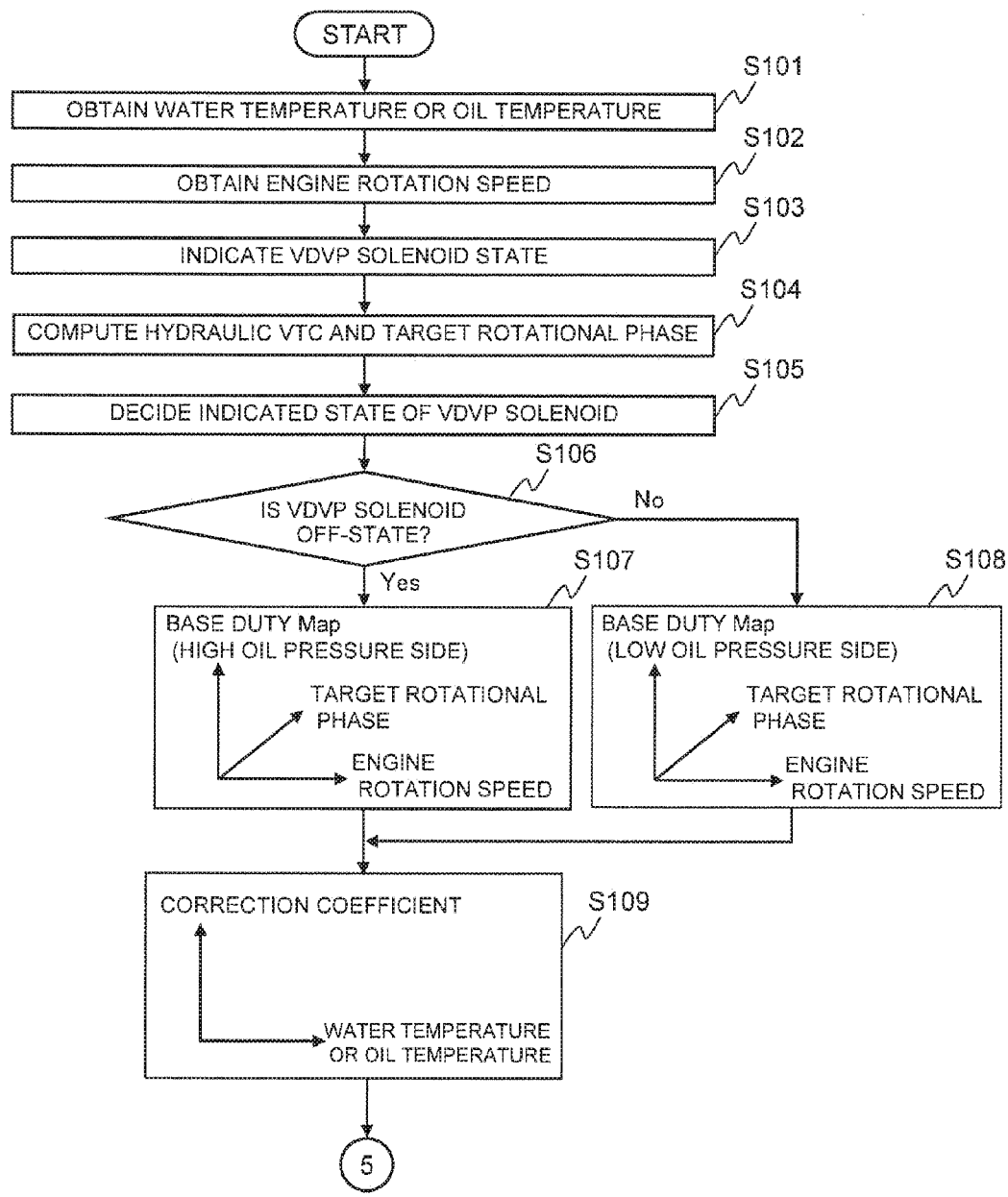
FIG. 14 is a flowchart illustrating a sixth control method of the control unit for the variable valve mechanism according to the embodiment of the present invention.
Figure 15:
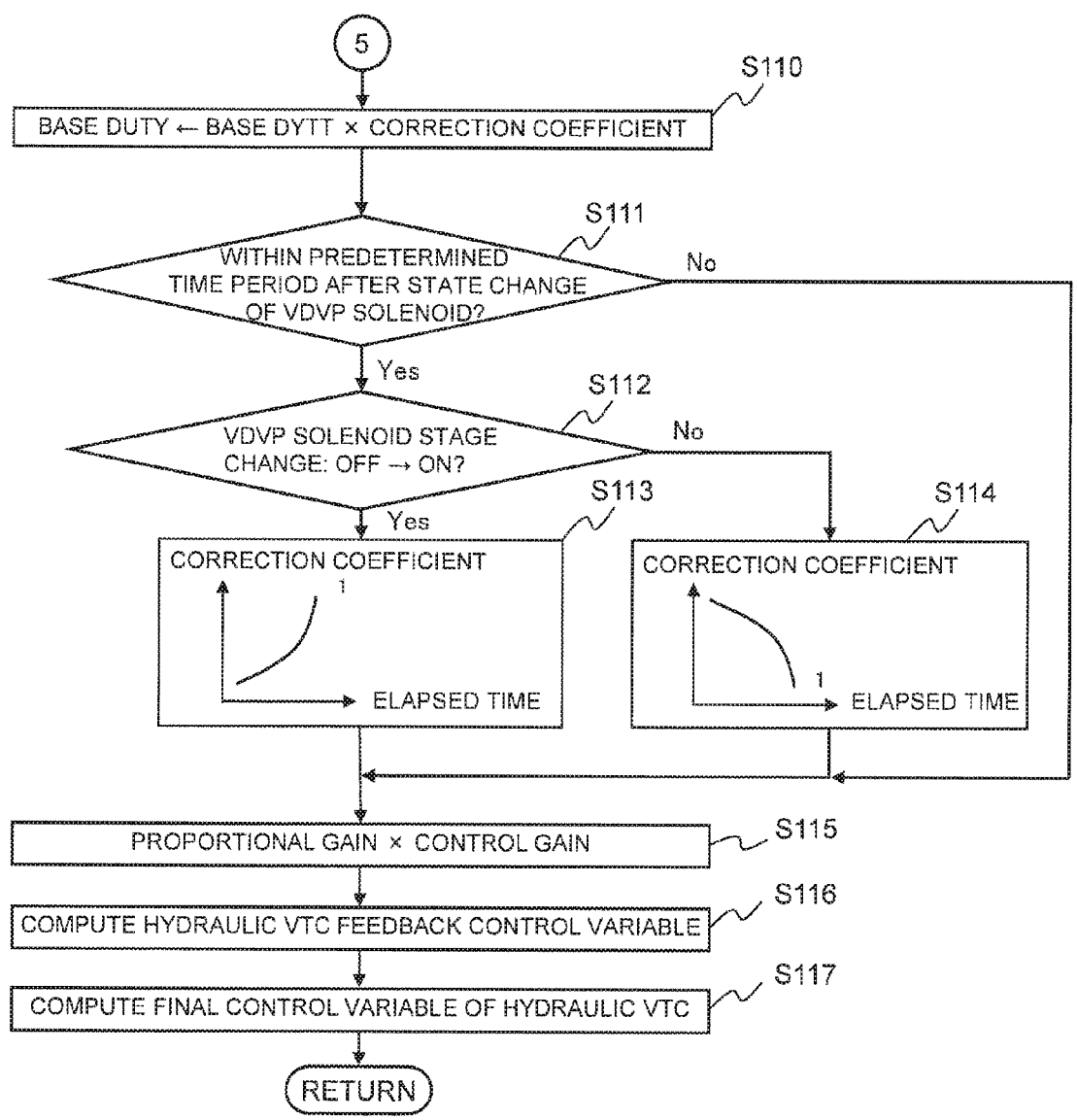
FIG. 15 is a flowchart illustrating the control method continued from FIG. 14.

The sixth control method illustrated in FIG. 14 and FIG. 15 is different from the fourth control method described above in transitional correction method for a base duty. In other words, although switching by use of a map for two base duty for the high-pressure side and the low-pressure side is similar, the manner of smoothing based on filtering processing is changed from the fourth control method. First, a water temperature or an oil temperature is obtained (step S101), and an engine rotation speed is obtained (step S102). In step S103, the state of solenoid valve 71 is indicated. In subsequent step S104, a target rotational phase of hydraulic VTC mechanism 26 is computed, and the state indication of solenoid valve 71 is determined (step S105). Determination of the state indication of solenoid valve 71 is basically performed by determining the state indicated by ECU 6. However, for the failure (on-state sticking, off-state sticking) of solenoid valve 71, reference is not made to the stated indicated by ECU 6, but is made to diagnose results described later.

Subsequently, whether or not the state of solenoid valve 71 is off is decided (step S106). If solenoid valve 71 is off, the base duty map for the high-pressure side is referenced (step S107), whereas if it is on, the base duty map for the low-pressure side is referenced (step S108). Then, a map, in which the relationship between the water or oil temperature and the correction coefficient is represented, is referenced (step S109), and the result obtained by multiplying the base duty with the correction coefficient is newly defined as a base duty (step S110).

In step S111, it is decided whether or not within a predetermined time after change of the state of solenoid valve 71. If it is within the predetermined time, it is decided whether or not the state change of solenoid valve 71 is off-to-on change (step S112). If the change is off-to-on change, the correction coefficient is gradually increased, finally to 1 (an uncorrected state) (step S113). On the other hand, for changing from on to off, the correction coefficient is set to be gradually decreased, finally to 1 (an uncorrected state) (step S114). In next step S115, correction is made by multiplying the proportional gain by the correction coefficient (step S115). On the other hand, if it is not within the predetermined time in step S111, control proceeds to step S115, in which correction is made by multiplying the proportional gain by the correction coefficient. In next step S116, after the feedback control variable of hydraulic VTC mechanism 26 is computed, a final control variable of hydraulic VTC mechanism 26 is computed (step S117). The final control variable is the result obtained by multiplying the feedback controlled variable computed in previous step S116 by the base duty.

Then, based on the computed feedback control variable, ECU 6 supplies a duty control signal to solenoid 34a of solenoid valve 34, so as to cause hydraulic VTC mechanism 26 to advance or retard the valve timing of intake valve 13. According to the control method as described above, the base duty maps of hydraulic VTC mechanism 26 for the high-pressure side and the low-pressure side are swapped based on an on/off state of solenoid valve 71, and the base duty is corrected, whereby hydraulic VTC mechanism 26 is allowed to be driven according to an actual oil pressure state while maintaining the rotational phase of hydraulic VTC mechanism 27, overshoot and response delay can be suppressed, and deterioration of fuel efficiency, operability, etc., can be suppressed.

Seventh Control Method

Figure 16:
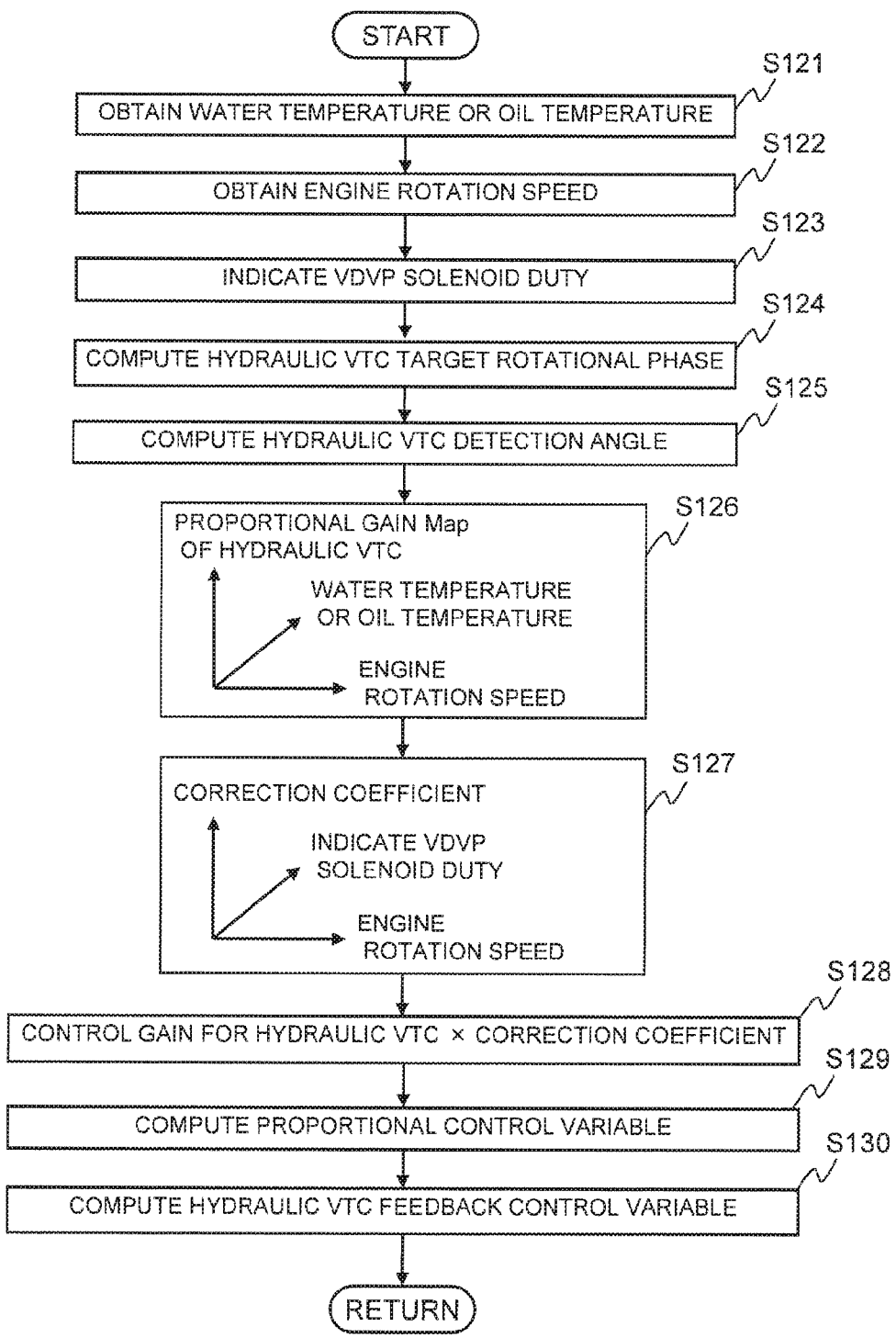
FIG. 16 is a flowchart illustrating a seventh control method of the control unit for the variable valve mechanism according to the embodiment of the present invention.

The first to sixth control methods above are described taking as an example the case in which electronic VDVP 54 is of two stage type. A seventh control method illustrated in FIG. 16 is a method for the case in which electronic VDVP is of multi-stage type. First, a water temperature or an oil temperature is obtained (step S121), and an engine rotation speed is obtained (step S122). In step S123, the duty of solenoid valve 71 is indicated. When electronic VDVP 54 is of multi-stage type, an indicated value concerning the duty of solenoid valve 71 can take from 0 to 100%. This indicated value concerning the duty corresponds to the pump rotation speed or pump rotation control variable of electronic VDVP 54. In subsequent step S124, a target rotational phase of hydraulic VTC mechanism 26 is computed. In step S125, a detection angle of hydraulic VTC mechanism 26 is computed.

Subsequently, the control gain map of hydraulic VTC mechanism 26 is referenced (step S126), and the duty correction coefficient map of a signal driving a solenoid valve is referenced (step S127). In step S126, a water temperature TW or an oil temperature TO is used in the control gain map. However, using the oil temperature TO is preferable. The water temperature TW may be used as a substitute therefor when oil temperature sensor 33 is not provided. The solenoid valve duty in step S127 corresponds to the rotation speed or rotation control variable of electronic VDVP.

In next step S128, the control gain of hydraulic VTC mechanism 26 obtained from the map in step S126 is multiplied by the correction coefficient obtained from the map in S127. In step S129, a proportional control variable is computed using the proportional gain and the phase of "target angle-actual angle". In subsequent step S130, a feedback control variable of hydraulic VTC mechanism 26 is computed, using the computed proportional controlled variable, an integral manipulated variable, a derivative manipulated variable, etc. Then, based on the computed feedback control variable, ECU 6 supplies a duty control signal to solenoid 34a of solenoid valve 34, so as to cause hydraulic VTC mechanism 26 to advance or retard the valve timing of intake valve 13. According to the control method as described above, even if electronic VDVP is of multi-stage type, hydraulic VTC mechanism is allowed to be driven according to an actual oil pressure state, overshoot and response delay can be suppressed, and deterioration of fuel efficiency, operability, etc., can be suppressed.

Diagnostic Method

In the following, a method for diagnosis sticking of solenoid valve 71 will be described with reference to FIGS. 17 to 20. As illustrated in the flowcharts in FIGS. 17 and 18, a water temperature or an oil temperature is obtained (step S131), and an engine rotation speed is obtained (step S132). In step S133, a previous detection angle value of hydraulic VTC mechanism 27 is computed. In next step S134, a detection angle of hydraulic VTC mechanism 26 is computed, a final control variable of hydraulic VTC mechanism 26 is computed (step S135), and phase change amount of hydraulic VTC mechanism 26 is computed (step S136).

In step S137, whether or not the indication concerning the state of solenoid valve 71 is off is decided. If solenoid valve 71 is off, an assumed oil pressure map for the high-pressure side is referenced (step S138), an expected phase change amount value map of hydraulic VTC mechanism 27 is referenced (step S139), and the expected phase change amount value is subtracted from the phase change amount (step S140). In step S141, it is decided whether the computed result obtained in previous step S140 is not greater than predetermined value Va, i.e. Whether "phase change amount−expected phase change amount value< predetermined value Va" is satisfied. If it is satisfied, the, whether or not the predetermined time is elapsed is decided (step S142). If the predetermined time is elapsed, it is decided that solenoid valve 71 is sticking to on-side (step S143). If the condition is not satisfied in step S141 or S142, there is no sticking of solenoid valve 71. Thus, operation is returned to the control operation.

If solenoid valve 71 is not off, an assumed oil pressure map for the low-pressure side is referenced (step S144), the expected phase change amount value map of hydraulic VTC mechanism 27 is referenced (step S145), and the expected phase change amount value is subtracted from the phase change amount (step S146). In step S147, it is decided whether the computed result obtained in previous step S146 is not greater than predetermined value Vb, i.e. whether "phase change amount−expected phase change amount value>predetermined value Va" is satisfied. If it is satisfied, then, whether or not the predetermined time has elapsed is decided (step S148). If the predetermined time has elapsed, it is decided that solenoid valve 71 is sticking to off-side (step S149). If the condition is not satisfied in step S147 or S148, there is no solenoid sticking. Thus, operation is returned to the control operation.

Figure 17:
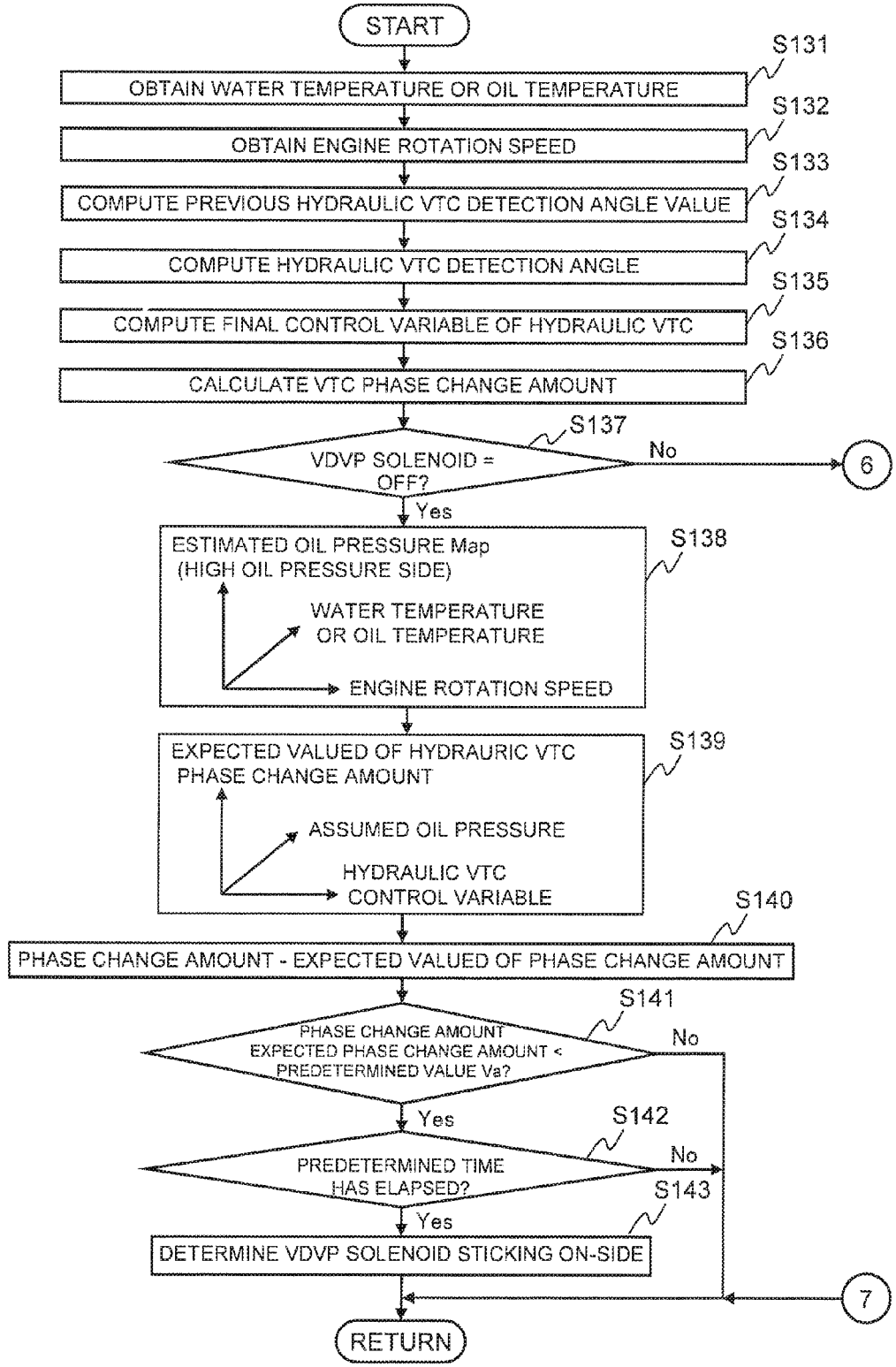
FIG. 17 is a flowchart illustrating a diagnostic method for diagnosing whether a solenoid valve is stuck in the electronic VDVP.
Figure 18:
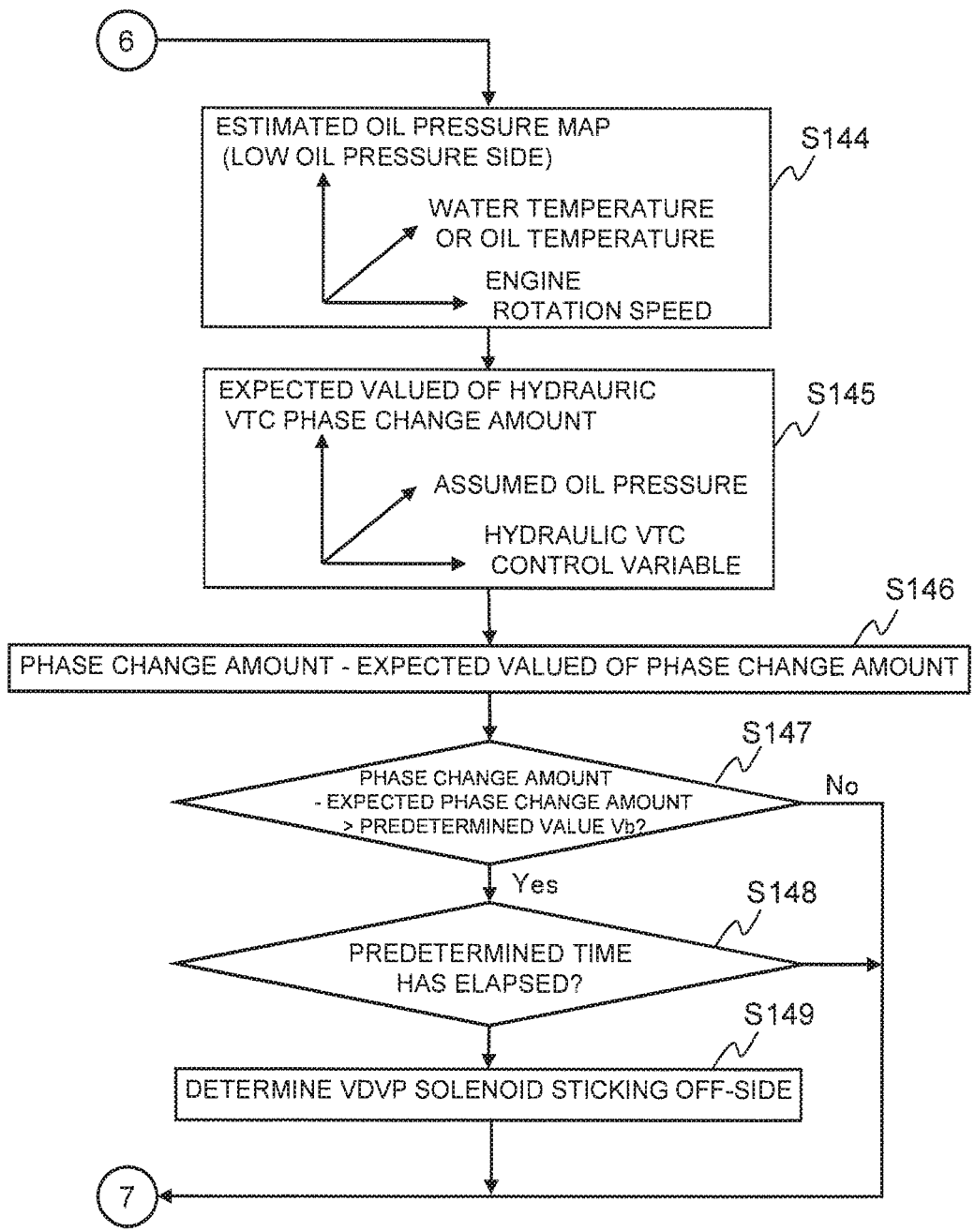
FIG. 18 is a flowchart illustrating the diagnostic method continued from FIG. 17.
Figures 19, 20:
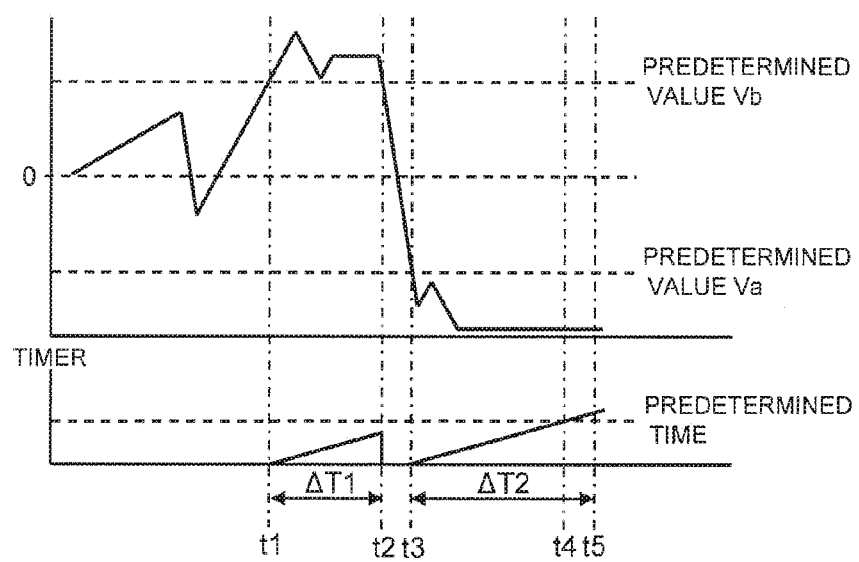
FIG. 19 is a diagram for explaining the relationship among a hydraulic pressure condition, sticking of a solenoid valve, and an indicated value concerning a solenoid valve state.
FIG. 20 is a flowchart explaining operations when diagnosing whether a solenoid valve is stuck in the electronic VDVP.

FIG. 19 illustrates summary of the relationship among the oil pressure state illustrated in the flowcharts in FIGS. 17 and 18 above, the solenoid sticking, and the indicated solenoid-state values. As illustrated in FIG. 19, whether the solenoid valve 71 is sticking at the on-side or the off-side can be decided based on whether the indicated value concerning the state of solenoid valve 71 is on or off, and based on the relationship between the phase change amount and the expected value at the time. As illustrated in the timing chart in FIG. 20, if the "phase change amount−expected value of phase change amount" exceeds the predetermined value Vb at the timing at time t1, and becomes lower than the predetermined value Vb at the timing at time t2, a timer starts a count operation at time t1 and stops it at time t2. If the period T1 between t1 and 52 is shorter than the predetermined time, it is decided that there is no sticking. If the "phase change amount−expected phase change amount value" becomes lower than the predetermined value Va at the timing at time t3, and the low state is maintained after time t5 (period T2), the time starts the count operation at time t3 and the predetermined time is exceeded at time t4. At time t4, it is decided that the on-side is stuck. Thus, the failure of solenoid valve 71 (on-sticking, off-sticking) can be found by using the diagnostic method described above in combination with the first to seventh control methods.

REFERENCE SYMBOL LIST

1 engine (internal combustion engine)
3 ECU
26 hydraulic VTC mechanism (variable valve mechanism)
34 solenoid valve
34a solenoid
54 electronic VDVP (variable displacement pump)
71 solenoid valve

The invention claimed is:

1. A control apparatus for a variable valve mechanism that is operated by an oil pressure by a variable displacement pump, comprising:
   a control unit configured to:
   switch a control gain of the variable valve mechanism to a control gain for a first oil pressure when the variable displacement pump is under the first oil pressure or the first oil pressure is indicated, and
   switch the control gain of the variable valve mechanism to a control gain for a second oil pressure when the variable displacement pump is under the second oil pressure that is different from the first oil pressure, or the second oil pressure is indicated;

or a control unit configured to use an oil pressure ratio between the second oil pressure and the first oil pressure as a correction coefficient, and to multiply the control gain of the variable valve mechanism by the correction coefficient based on whether the variable displacement pump is under the first oil pressure or the second oil pressure, or whether the first oil pressure or the second oil pressure is indicated.

2. The control apparatus for a variable valve mechanism according to claim 1, wherein a capacity of the variable displacement pump is changed according to an operation state of an internal combustion engine on which the variable valve mechanism is mounted.

3. The control apparatus for a variable valve mechanism according to claim 1, wherein the control gain is set based on a map including at least one of a water temperature, an oil temperature, or an engine rotation speed, of an internal combustion engine.

4. The control apparatus for a variable valve mechanism according to claim 3, wherein the control gain is set in accordance with a transition property of an oil pressure in the variable displacement pump.

5. The control apparatus for a variable valve mechanism according to claim 1, wherein the control gain is set based on computation using a correction coefficient.

6. The control apparatus for a variable valve mechanism according to claim 5, wherein the control gain is set in accordance with a transition property of an oil pressure in the variable displacement pump.

7. The control apparatus for a variable valve mechanism according to claim 1, wherein the control unit is configured to:
switch the control gain of the variable valve mechanism to the control gain for the first oil pressure when the variable displacement pump is under the first oil pressure or the first oil pressure is indicated, and
switch the control gain of the variable valve mechanism to the control gain for the second oil pressure when the variable displacement pump is under the second oil pressure that is different from the first oil pressure, or the second oil pressure is indicated, and
the switching of the control gain of the variable valve mechanism is performed so that a control gain map of the variable valve mechanism for the first oil pressure and a control gain map of the variable valve mechanism for the second oil pressure are provided, and the control unit is configured to switch the maps to be referenced based on on/off of a solenoid valve of the variable displacement pump.

8. The control apparatus for a variable valve mechanism according to claim 1, wherein the control unit is configured to use the oil pressure ratio between the second oil pressure and the first oil pressure as the correction coefficient, and to multiply the control gain of the variable valve mechanism by the correction coefficient based on whether the variable displacement pump is under the first oil pressure or the second oil pressure, or whether the first oil pressure or the second oil pressure is indicated, and
correction of a control gain map for the variable valve mechanism is performed by referencing a map in which the oil pressure ratio between the second oil pressure and the first oil pressure for each engine rotation speed is stored as the correction coefficient, and multiplying the control gain of the variable valve mechanism by the correction coefficient based on on/off of a solenoid valve of the variable valve mechanism.

9. The control apparatus for a variable valve mechanism according to claim 1, wherein the control unit is configured to:
switch the control gain of the variable valve mechanism to the control gain for the first oil pressure when the variable displacement pump is under the first oil pressure or the first oil pressure is indicated, and
switch the control gain of the variable valve mechanism to the control gain for the second oil pressure when the variable displacement pump is under the second oil pressure that is different from the first oil pressure, or the second oil pressure is indicated, and
when the control gain is switched, correction is made on the control gain so that a change of the control gain follows a rising or falling characteristic of an actual oil pressure.

10. A control method for a variable valve mechanism that is operated by an oil pressure by a variable displacement pump, the control method comprising:

when it is decided that the variable displacement pump is in a first oil pressure state or that there is a state in which a first oil pressure is indicated, a control gain of the variable valve mechanism is switched to a control gain for the first oil pressure, and when it is decided that the variable displacement pump is in a second oil pressure state that is different from the first oil pressure state or that there is a state in which a second oil pressure is indicated, the control gain of the variable valve mechanism is switched to a control gain for the second oil pressure, or an oil pressure ratio between the second oil pressure and the first oil pressure is used as a correction coefficient, and the control gain of the variable valve mechanism is multiplied by the correction coefficient based on whether the variable displacement pump is under the first oil pressure or the second oil pressure, or whether the first oil pressure or the second oil pressure is indicated.

11. The control method for a variable valve mechanism according to claim 10, further comprising:

changing a capacity of the variable displacement pump according to an operation state of an internal combustion engine on which the variable valve mechanism is mounted.

12. The control method for a variable valve mechanism according to claim 10, wherein the control gain is set based on a map including at least one of a water temperature, an oil temperature, or an engine rotation speed, of an internal combustion engine.

13. The control method for a variable valve mechanism according to claim 12, wherein the control gain is set further in accordance with a transition property of the variable displacement pump.

14. The control method for a variable valve mechanism according to claim 10, wherein the control gain is set based on computation using a correction coefficient.

15. The control method for a variable valve mechanism according to claim 14, wherein the control gain is set further in accordance with a transition property of the variable displacement pump.

16. The control method for a variable valve mechanism according to claim 10, wherein when it is decided that the variable displacement pump is in the first oil pressure state or that there is the state in which the first oil pressure is indicated, the control gain of the variable valve mechanism is switched to the control gain for the first oil pressure, and when it is decided that the variable displacement pump is in the second oil pressure state that is different from the first oil pressure state or that there is the state in which the second oil pressure is indicated, the control gain of the variable valve mechanism is switched to the control gain for the second oil pressure, and the switching of the control gain of the variable valve mechanism is performed so that a control gain map of the variable valve mechanism for the first oil pressure and a control gain map of the variable valve mechanism for the second oil pressure are provided, and the map to be referenced is switched based on on/off of a solenoid valve of the variable displacement pump.

17. The control method for a variable valve mechanism according to claim 10, wherein the oil pressure ratio between the second oil pressure and the first oil pressure is used as the correction coefficient, and the control gain of the variable valve mechanism is multiplied by the correction coefficient based on whether the variable displacement pump is under the first oil pressure or the second oil pressure, or whether the first oil pressure or the second oil pressure is indicated, and correction of a control gain map for variable valve mechanism is performed by referencing a map in which the oil pressure ratio between the second oil pressure and the first oil pressure for each engine rotation speed is stored as the correction coefficient, and multiplying the control gain of the variable valve mechanism by the correction coefficient based on on/off of a solenoid valve of the variable valve mechanism.

18. The control method for a variable valve mechanism according to claim 10, wherein when it is decided that the variable displacement pump is in the first oil pressure state or that there is the state in which the first oil pressure is indicated, the control gain of the variable valve mechanism is switched to the control gain for the first oil pressure, and when it is decided that the variable displacement pump is in the second oil pressure state that is different from the first oil pressure state or that there is the state in which the second oil pressure is indicated, the control gain of the variable valve mechanism is switched to the control gain for the second oil pressure, and when the control gain is switched, correction is made on the control gain so that a change of the control gain follows an actual rising or falling characteristic of an actual oil pressure.

19. A control apparatus for a rotor and pulley system operated by an oil pressure by a variable displacement pump, comprising:

a control unit configured to
switch a control gain of the rotor and pulley system to a control gain for a first oil pressure when the variable displacement pump is under the first oil pressure or the first oil pressure is indicated, and
switch the control gain of the rotor and pulley system to a control gain for a second oil pressure when the variable displacement pump is under the second oil pressure that is different from the first oil pressure, or the second oil pressure is indicated;

or a control unit configured to use an oil pressure ratio between the second oil pressure and the first oil pressure as a correction coefficient, and to multiply the control gain of the rotor and pulley system by the correction coefficient based on whether the variable displacement pump is under the first oil pressure or the second oil pressure, or whether the first oil pressure or the second oil pressure is indicated.

* * * * *